US011594224B2

(12) United States Patent
Wang et al.

(10) Patent No.: US 11,594,224 B2
(45) Date of Patent: Feb. 28, 2023

(54) VOICE USER INTERFACE FOR INTERVENING IN CONVERSATION OF AT LEAST ONE USER BY ADJUSTING TWO DIFFERENT THRESHOLDS

(71) Applicant: SAMSUNG ELECTRONICS CO., LTD., Suwon-si (KR)

(72) Inventors: Kun Wang, Nanjing (CN); Yanfang Pan, Nanjing (CN); Yazhi Zhao, Nanjing (CN); Lin Ding, Nanjing (CN); Yueyue Jiang, Nanjing (CN); Xu Fan, Nanjing (CN); Bo Peng, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 17/112,053

(22) Filed: Dec. 4, 2020

(65) Prior Publication Data
US 2021/0174805 A1    Jun. 10, 2021

(30) Foreign Application Priority Data

Dec. 4, 2019   (CN) .......................... 201911225855.3
Dec. 1, 2020   (KR) ......................... 10-2020-0166059

(51) Int. Cl.
*G10L 15/22*  (2006.01)
*H04W 76/45*  (2018.01)
(Continued)

(52) U.S. Cl.
CPC ............ *G10L 15/222* (2013.01); *G06F 3/167* (2013.01); *G10L 25/63* (2013.01); *G10L 2015/225* (2013.01); *G10L 2015/228* (2013.01)

(58) Field of Classification Search
CPC ......... H04W 76/45; H04M 9/00; H04M 3/56; H04L 12/1822; H04L 65/403
(Continued)

(56) References Cited

U.S. PATENT DOCUMENTS 7,603,273 B2   10/2009   Poirier
8,935,163 B2    1/2015   Huang et al.
(Continued)

FOREIGN PATENT DOCUMENTS

CN    101656799 A    2/2010
CN    106354835 A    1/2017
(Continued)

OTHER PUBLICATIONS

Martin Porcheron et al. ""Do Animals Have Accents?": Talking with Agents in Multi-Party Conversation" ACM, 2017, retrieved from http://dx.doi.org/10.1145/2998181.2998298 , (13 pages total).
(Continued)

*Primary Examiner* — Farzad Kazeminezhad
(74) *Attorney, Agent, or Firm* — Sughrue Mion, PLLC

(57) ABSTRACT

An electronic device is provided. The electronic device includes a memory configured to store at least one instruction, and at least one processor where the at least one processor is configured to execute the instruction to obtain voice data from a conversation of at least one user, convert the voice data to text data, determine at least one parameter indicating characteristic of the conversation based on at least one of the voice data or the text data, adjust a condition for triggering intervention in the conversation based on the determined at least one parameter, and output a feedback based on the text data when the adjusted condition is satisfied, wherein the adjustment of the condition includes adjusting a first and a second threshold based on change of the at least one parameter.

20 Claims, 20 Drawing Sheets

(51) Int. Cl.
*H04M 9/00* (2006.01)
*H04L 12/18* (2006.01)
*H04L 65/403* (2022.01)
*H04M 3/56* (2006.01)
*G06F 3/16* (2006.01)
*G10L 25/63* (2013.01)

(58) Field of Classification Search
USPC .................. 455/518; 709/206; 379/202.01
See application file for complete search history.

(56) References Cited

U.S. PATENT DOCUMENTS

| | | | |
|---|---|---|---|
| 9,596,349 | B1 | 3/2017 | Hernandez |
| 10,452,352 | B2 | 10/2019 | Kawahara et al. |
| 10,789,951 | B2 | 9/2020 | Ushio et al. |
| 10,893,149 | B2 * | 1/2021 | Tassone ............... H04M 9/00 |
| 2006/0079260 | A1 * | 4/2006 | Tillet .................. H04W 76/45 455/518 |
| 2006/0177802 | A1 | 8/2006 | Hiroe et al. |
| 2008/0235017 | A1 | 9/2008 | Satomura |
| 2009/0210411 | A1 | 8/2009 | Murata et al. |
| 2014/0037080 | A1 * | 2/2014 | Chakra ............... H04M 3/56 379/202.01 |
| 2016/0142674 | A1 * | 5/2016 | Travis ............... H04L 65/403 348/14.07 |
| 2017/0125008 | A1 | 5/2017 | Maisonnier et al. |
| 2017/0237785 | A1 * | 8/2017 | Peng ................ H04L 65/403 709/206 |
| 2018/0089173 | A1 | 3/2018 | Prendergast et al. |
| 2019/0028641 | A1 | 1/2019 | Rigneault et al. |
| 2020/0226217 | A1 * | 7/2020 | Anders ............... H04L 12/1822 |

FOREIGN PATENT DOCUMENTS

| | | |
|---|---|---|
| CN | 106599124 A | 4/2017 |
| CN | 108028870 A | 5/2018 |
| CN | 108630203 A | 10/2018 |
| CN | 108874895 A | 11/2018 |
| CN | 109086264 A | 12/2018 |
| CN | 109326289 A | 2/2019 |
| CN | 109616116 A | 4/2019 |
| CN | 110085262 A | 8/2019 |
| CN | 110517685 A | 11/2019 |
| JP | 2011-76627 A | 4/2011 |
| JP | 2017-156854 A | 9/2017 |
| KR | 10-1891496 B1 | 8/2018 |

OTHER PUBLICATIONS

Bryan Minor et al. "Learning Activity Predictors from Sensor Data: Algorithms, Evaluation, and Applications" IEEE Trans Knowl Data Eng., vol. 12, Dec. 1, 2017, (40 pages total).
International Search Report (PCT/ISA/210) and Written Opinion (PCT/ISA/237) dated Mar. 16, 2021 by the International Searching Authority in International Application No. PCT/KR2020/017706.
Communication dated Oct. 26, 2021 by the China National Intellectual Property Administration in Chinese Patent Application No. 201911225855.3.

* cited by examiner

FIG. 6

| SCENARIO / FEATURE | | CHAT TYPE | DISCUSSION TYPE AND Q&A TYPE | FIXED CONVERSATION PROGRAM TYPE | COMMENT |
|---|---|---|---|---|---|
| TAGGING USERS AND DETERMINING THE NUMBER OF USERS IN A CONVERSATION SCENARIO AND RULES OF THE CONVERSATION | CONVERSATION STRUCTURE | ①→②→③→④→AI→ | ①→(N)(3)(2)→①→(N)(3)(2)→AI→ | ①→②→③→④→AI→ | A NUMBER IN A CIRCLE INDICATES THE NUMBER OF USERS |
| ANALYZING VOICE WAVEFORM CHARACTERISTIC OF THE CONVERSATION SCENARIO TO DETERMINE THE CONVERSATION RHYTHM IN THE CONVERSATION SCENARIO | INTERACTION RHYTHM | NO RHYTHM | PERIODIC RHYTHM | RHYTHM IS RELATIVELY REGULAR | DETERMINED BASED ON SOUND WAVEFORM |
| TAGGING KEYWORD WITH VOICE CONTENT TO DETERMINE TOPIC OF THE CONVERSATION SCENARIO | WHETHER A TOPIC KEYWORD IS FIXED | A TOPIC IS CONSISTENT IN SPEECH | A TOPIC IS CONSISTENT IN SPEECH | A TOPIC IS UNCLEAR IN SPEECH BUT IS CONSISTENT IN A CONVERSATION | COMPARE REPETITION RATES FOR KEYWORDS IN SPOKEN CONTENT |
| | IMPACT FACTOR | NUMBER OF USERS, EMOTION OF SPEAKER, AND CHARACTER FEATURE OF SPEAKER | | | |

VOICE USER INTERFACE FOR INTERVENING IN CONVERSATION OF AT LEAST ONE USER BY ADJUSTING TWO DIFFERENT THRESHOLDS

CROSS-REFERENCE TO RELATED APPLICATION(S)

This application is based on and claims priority under 35 U.S.C. § 119(a) of a Chinese patent application number 201911225855.3, filed on Dec. 4, 2019, in the State Intellectual Property Office of P.R. China, and of a Korean patent application number 10-2020-0166059, filed on Dec. 1, 2020, in the Korean Intellectual Property Office, the disclosure of each of which is incorporated by reference herein in its entirety.

BACKGROUND

1. Field

The present disclosure relates to a voice user interface (VUI). More particularly, the disclosure relates to an artificial intelligence (AI) system of imitating functions of the human brain such as cognition and judgment by utilizing machine learning algorithms, and applications thereof.

2. Description of Related Art

With the rapid development of mobile smart terminals and cloud computing, every bit of life is improving thanks to the wave of artificial intelligence. Intelligent voice user interface (VUI) has also rapidly developed as a new field, and has different requirements on user experience, linguistics, emotional shaping, and logical construction. The intelligent voice user interface provides a user with interaction modes based on voice input, which allows the user to ask a question and acquire an answer to the question by voice. A typical application scenario is a voice assistant. The voice assistant helps users solve problems through intelligent interaction of intelligent conversation and real-time Q&A (question & answer). The voice assistant may help the users to solve various problems.

Conventional voice interaction operates in a cyclic mode in which a human actively provides an input to a machine and the machine passively provides a feedback to the input. A voice system may only obey user instructions. Therefore, it may be difficult to implement natural voice interaction with such passive mechanism. For example, mechanical feedback fails to take conversation scenario requirements into account, which makes the machine to appear to have a low "Emotional Quotient (EQ)" and may even harm user experience during human-computer interaction.

An artificial intelligence (AI) system may refer to a computer system that enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology may consist of a machine learning (deep learning) technology and elementary technologies which use the machine learning.

Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding may refer to a technology for recognizing human language/characters for application/processing and includes natural language processing, machine translation, a dialog system, question answering, speech recognition/synthesis, etc. Visual understanding may refer to a technology for recognizing and processing an object, in the same way as performed by a human visual system, and includes object recognition, object tracking, image retrieval, user recognition, scene understanding, spatial understanding, image enhancement, etc. Reasoning/prediction may refer to a technology for judging information and logically inferring and predicting new information and includes knowledge/probability-based interference, optimization prediction, preference-based planning, recommendations, etc. Knowledge representation may refer to a technology for automatically processing information about human experience as knowledge data and includes knowledge construction (data generation/classification), knowledge management (data utilization), etc. Motion control may refer to a technology for controlling autonomous driving of a vehicle and motion of a robot and includes movement control (navigation, collision avoidance, and travelling), manipulation control (action control), etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device, comprising a memory storing instructions, and at least one processor configured to execute the instructions to obtain text including characters, identify, based on a language model, a domain corresponding to the text, identify a reference of the characters based on the domain, and perform, based on the reference, an action related to the domain.

Additional aspects will be set forth in part in the description which follows and, in part, will be apparent from the description, or may be learned by practice of the presented embodiments.

In accordance with an aspect of the disclosure, an electronic device is provided. the electronic device includes a memory storing at least one instruction, at least one processor configured to execute the instruction to obtain voice data from a conversation of at least one user, convert the voice data to text data, determine at least one parameter indicating characteristic of the conversation based on at least one of the voice data or the text data, adjust a condition for triggering intervention in the conversation based on the determined at least one parameter, and output a feedback based on the text data when the adjusted condition is satisfied.

In an embodiment, the at least one parameter may include a conversation scenario parameter indicating a scenario of the conversation, and the at least one processor may be further configured to adjust the condition based on the conversation scenario parameter.

In an embodiment, the at least one processor may be further configured to adjust the condition during the conversation based on the conversation scenario parameter.

In an embodiment, the condition may include a threshold, and the at least one processor may be further configured to adjust a size of the threshold based on the determined at least one parameter.

In an embodiment the condition may include at least one of a conversation pause time threshold or a conversation exchange frequency threshold.

In an embodiment, the at least one processor may be further configured to inversely adjust the conversation pause time threshold and the conversation exchange frequency threshold based on the determined at least one parameter.

In an embodiment, the at least one processor may be further configured to output the feedback when a conversation pause time during the conversation exceeds the conversation pause time threshold or when a conversation exchange frequency during the conversation falls below the conversation exchange frequency threshold.

In an embodiment, the at least one parameter may include a user character parameter indicating characteristic of the at least one user participating in the conversation, and the at least one processor may be further configured to adjust the condition during the conversation based on the user character parameter.

In an embodiment, the at least one processor may be further configured to determine the user character parameter based on speech tempo of the at least one user.

In an embodiment, the at least one processor may be further configured to determine the user character parameter based on an amount of speech of the at least one user within a unit time.

In an embodiment, the condition may include a conversation pause time threshold or a conversation exchange frequency threshold, and the at least one processor may be further configured to decrease the conversation pause time threshold and increase the conversation exchange frequency threshold when a speech tempo of the at least one user quickens or an amount of speech of the at least one user increases.

In an embodiment, the at least one parameter may include a number-of-users parameter indicating the number of the at least one user, and the at least one processor may be further configured to vary the condition based on the number-of-users parameter.

In an embodiment, the condition may include a conversation pause time threshold or a conversation exchange frequency threshold, and the at least one processor may be further configured to decrease the conversation pause time threshold and increase the conversation exchange frequency as the number-of-users parameter increases.

In an embodiment, the at least one parameter may include a user emotion parameter indicating an emotion state of the at least one user, and the at least one processor may be further configured to adjust the condition during the conversation based on the user emotion parameter.

In an embodiment, the condition may include a conversation pause time threshold or a conversation exchange frequency threshold, and the at least one processor may be further configured to decrease the conversation pause time threshold and increase the conversation exchange frequency as the user emotion parameter increases.

In an embodiment, the at least one processor may be further configured to adjust the condition during the conversation based on the determined at least parameter to delay the intervention in the conversation.

In an embodiment, the condition may include a conversation pause time threshold or a conversation exchange frequency threshold, and the conversation pause time threshold may increase and the conversation exchange frequency threshold may decrease to delay the intervention in the conversation.

In an embodiment, the at least one processor may be further configured to calculate a weight value of the at least one parameter, and adjust the condition based on the weight value.

In accordance with another aspect of the disclosure, the disclosure provides a method includes obtaining voice data from a conversation of at least one user, converting the voice data to text data, determining at least one parameter indicating characteristic of the conversation based on at least one of the voice data or the text data, adjusting a condition for triggering intervention in the conversation based on the determined at least one parameter, and outputting a feedback based on the text data when the adjusted condition is satisfied.

In accordance with another aspect of the disclosure, a computer-readable recording medium having recorded thereon a program executable by a computer for performing the method is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects features, and advantages of certain embodiments of the disclosure will be more apparent from the following description taken in conjunction with the accompanying drawings, in which:

FIG. 6 is a schematic diagram of scenario classification according to an embodiment.

The same reference numerals are used to represent the same elements throughout the drawings.

DETAILED DESCRIPTION

Figure 1:
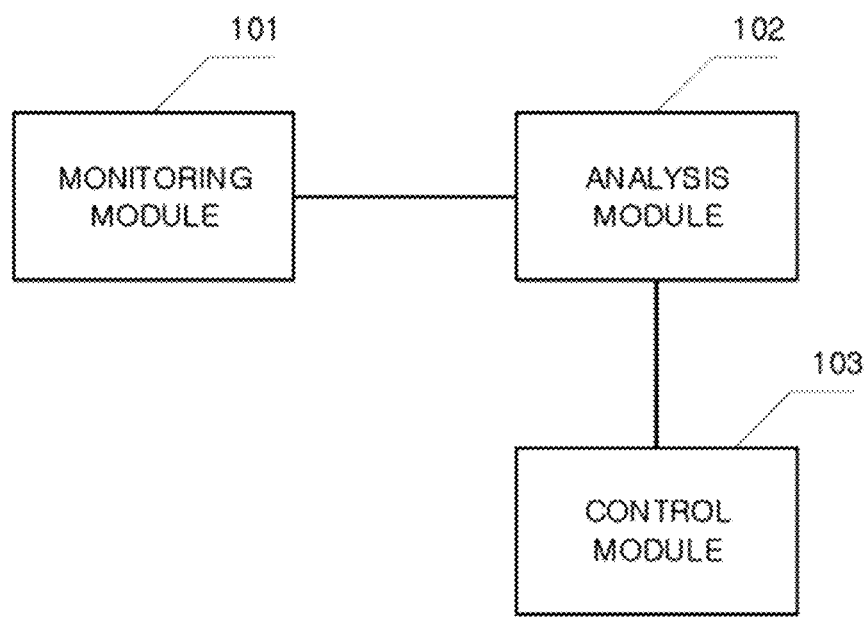
FIG. 1 is a structural diagram of a voice interaction apparatus according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

The term "-unit", "-module", etc. may refer to a unit in which at least one function or operation is processed and may be embodied as hardware, software, or a combination of hardware and software.

It should be understood that, although the terms "first," "second," etc. may be used herein to describe various elements, and these elements should not be limited by these terms. "First," "second," etc. are used to distinguish a component from another component. Therefore, a first element may be termed a second element within the technical scope of an exemplary embodiment.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

An electronic device may be a smartphone, tablet, cell phone, media player, personal digital assistant, portable multimedia player, e-book reader, digital broadcast device, personal computer, laptop computer, micro server, navigation, kiosk, music player, smart TV, digital camera, mobile device, or non-mobile device or a non-mobile, but is not limited thereto. The electronic device may be an end-user device.

Conventional intelligent voice user interface technology has many problems. Thus, a conventional voice assistant is taken as an example to explain technical problems existing in the conventional intelligent voice user interface technology. Those skilled in the art may understand that such explanation taking the conventional voice assistant as an example is merely exemplary, and is not used to limit a scope of the embodiments.

The conventional voice assistant has many technical problems in a multi-user conversation scenario and a natural interaction For example, configuration for the voice assistant is mostly based on analysis of an instruction in a single-user scenario, and it is impossible to make a natural conversation intervention in conversation contents of a multi-user conversation scenario.

For example, a human-computer interaction of the voice assistant operates in a cycle mode of a human's "input" and a machine "feedback." That is, the human-computer interaction works in a scenario where a human actively asks a question and a machine passively answers the question. Natural voice interaction may not be implemented with such "passive" mechanism.

For example, requirements of a conversation scenario may be not considered when the voice interaction assistant passively provides a feedback. Too "timely" or "instant" feedback often interrupts thinking and communication of users. The machine behaves like a human with low "EQ" in a human-computer interaction process, which provides a user with poor user experience.

According to an embodiment, a multi-user voice recognition technology may be implemented by a voiceprint recognition. A voiceprint is a fingerprint of a voice. The voiceprint is a unique feature of an individual, which may help a machine to effectively distinguish voices of different people. Voiceprint recognition includes a static detection method and a dynamic detection method. The static detection method may include extracting a fundamental frequency and a harmonious frequency of a speaker's voice according to a spectrogram, and obtaining a similarity between different spectrograms using a matching method such as pattern recognition, thereby realizing the voiceprint recognition. The dynamic detection method may use various principles of the static detection, and various algorithms such as VAD, noise reduction, de-reverberation and the like at the same time, and further use a machine learning model or a deep learning model, so that the voiceprint recognition may be greatly improved.

The technology of voice interaction using a wake-up word is adopted and used by conventional voice assistant products. In a one-time conversation design, that is, a user says a wake-up word first and asks a question to a voice assistant, and then the voice assistant recognizes the question and provides the user with an answer to the question. However, it may be difficult for the voice assistant in the one-time conversation design to understand context. Due to incomplete information, the voice assistant may fail to recognize an intention of the user, so it may incorrectly respond to the question or incorrectly execute an instruction, or sometimes the voice assistant may even "wake up by mistake" or "fail to wake up." In addition, a wake-up word is required, which interrupts a flow of conversation and affects interactive experience of a user.

The conventional voice assistant is targeted at a single-user scenario and may not operate properly in a multi-user conversation scenario. When the conventional voice assistant detects a request from a user in the multi-user conversation scenario, the conventional voice assistant merely performs a task-based interaction, so it is difficult to expect natural interaction in the multi-user conversation scenario.

According to an embodiment, appropriate intervention timing may be considered during a chat between users, which provides functional assistance, when the chat encounters a problem or it is silent, while avoiding disturbing the users.

An intelligent multi-user voice interaction technology solution aiming at limitations of the current intelligent voice system in the scenario of multi-user conversation and defects in natural implementation of human-computer interaction may be provided according to an embodiment. The multi-user conversation scenario may be covered by multi-user voice recognition according to an embodiment. Intention of users may be analyzed by performing semantic understanding and emotion recognition on a user conversation. A parameter such as a pause time and exchange frequency of the conversation may be detected during the user conversation to determine timing of a machine to intervene in the user conversation. In addition, the machine may actively wake-up to participate in the user conversation based on a result of determination of the timing, and may provide the users with corresponding feedback contents to smoothen the user conversation while satisfying the demand of the users and achieve more natural human-computer interaction.

In the disclosure, "feedback" indicates a response provided by a machine (a voice interaction apparatus) based on a conversation of users. When it is detected during the conversation of users that a user wonders about something, a feedback may be provided to the user based on the user's implicit or explicit question. The feedback provided based on the user's question will be explained later with embodiments related to a conversation of a chat type in the disclosure.

When a user's answer to a question of the voice interaction apparatus is detected in a conversation between users and the voice interaction apparatus, a feedback may be provided to the user based on the detected user's answer, and the feedback provided based on the user's answer will be explained later with embodiments related to a conversation of a Q&A discussion type in the disclosure.

When users and the voice interaction apparatus play a program such as a game according to a certain rule, a feedback may be provided to a user based on the user's participation in the program. The feedback provided based on a user's participation in the program will be explained later with embodiments related to a conversation of a fixed conversation program type in the disclosure.

A feedback may be output in various forms. The feedback is described as being output in audio by the voice interaction apparatus in the disclosure, but is not limited thereto. For example, the feedback may be visually displayed. A conversation of users are received at the voice interaction apparatus as audio in the disclosure, but is not limited thereto. For example, the disclosure does not exclude an embodiment where the conversation of users is received at the voice interaction apparatus as text.

FIG. 1 is a structural diagram of a voice interaction apparatus according to an embodiment.

As shown in FIG. 1, the voice interaction apparatus may include a monitoring module 101, an analysis module 102, and a control module 103, but is not limited thereto. The voice interaction apparatus may include more or less modules than the described modules.

The monitoring module 101 may be configured to monitor voice data and a conversation parameter in a user conversation, and convert the voice data into text data.

The analysis module 102 may be configured to analyze the text data to determine a user intention.

The control module 103 may be configured to send information determined based on the user intention to the user when it is determined that there is an intervention requirement based on the user intention and it is determined that intervention timing arrives based on the conversation parameter. The intervention timing indicates a proper timing for the voice interaction apparatus to actively intervene in a conversation of users.

According to an embodiment, the proper timing for the voice interaction apparatus to actively intervene in the conversation of users may be determined so an active interaction of a machine with users may be realized based on understanding intentions of users.

Here, the conversation parameter may include a user parameter related to the conversation (for example, the number of users, user character or user emotion, etc.) and a parameter of an attribute of the conversation (for example, conversation pause time, conversation exchange frequency, etc.). Preferably, the user conversation may be a conversation among multiple users (e.g., at least two users). In an embodiment, the conversation parameter may include at least one of: a conversation pause time; a conversation exchange frequency; the number of people involved in the conversation; a user emotion parameter; or a user character parameter, but is not limited thereto, and the conversation parameter may include other parameters than the described parameters. The conversation pause time may be a period of time when no one speaks during the conversation. That is, the conversation pause time may indicate a period of time that a voice of a user is not detected. For example, the conversation pause time may be calculated by measuring time from the last moment when a voice of a user is detected until a voice of a user is detected again. The conversation exchange frequency may be calculated based on a change of a speaker within a predetermined time. For example, the conversation exchange frequency may indicate a frequency with which a speaker is changed within a predetermined time during a conversation. That is, the conversation exchange frequency may indicate the number of time that a speaker is changed within the predetermined time during the conversation. Therefore, when the predetermined time is 1 minute, a first user speaks for 30 seconds, and a second user speaks for next 30 seconds, the conversation exchange frequency may be calculated as 1 time/minute. As another example, the conversation exchange frequency may indicate the number of time that conversation is exchanged within a predetermined time. Therefore, when the predetermined time is 1 minute, a first user speaks for 30 seconds, and a second user speaks for next 30 seconds, the conversation exchange frequency may be calculated as 2 time/minute. The conversation exchange frequency may be referred to as a conversation frequency or exchange frequency. The number of people involved in the conversation is the number of users participating in the conversation. The user emotion parameter may indicate that a user is happy, angry, scared or sad, and so on. The user character parameter may indicate that a user is talkative, non-talkative, speaks fast or speaks slowly, and so on.

The information determined based on the user intention may be implemented as prompt information with a type of voice, text, picture, video, and the like, and may also be implemented as non-prompt information such as a preset conversation.

In an embodiment, the conversation parameter may include a conversation pause time and/or a conversation exchange frequency. The control module 103 may be configured to determine that it is timing to intervene in a conversation of users when the conversation pause time is greater than a conversation pause time threshold and/or the conversation exchange frequency is less than a conversation exchange frequency threshold.

For example, the conversation parameter may include the conversation pause time or the conversation exchange frequency. The control module 103 may be configured to determine that it is timing to intervene in a conversation of users when the conversation pause time is greater than a predetermined conversation pause time threshold or the conversation exchange frequency is less than a predetermined conversation exchange frequency threshold.

As another example, the conversation parameter may include the conversation pause time and the conversation exchange frequency. The control module 103 may be configured to determine that it is timing to intervene in a conversation of users when the conversation pause time is greater than a predetermined conversation pause time threshold and the conversation exchange frequency is less than a predetermined conversation exchange frequency threshold.

In an embodiment, the conversation parameter may further include the number of people involved in the conversation, the user emotion parameter or the user character parameter. The control module 103 may be further configured to adjust the conversation pause time threshold and/or the conversation exchange frequency threshold based on the number of people involved in the conversation, the user emotion parameter or the user character parameter.

In an embodiment, the control module 103 may increase the conversation exchange frequency threshold and decrease the conversation pause time threshold as the number of people involved in the conversation increases.

In an embodiment, the control module 103 may decrease the conversation exchange frequency threshold and increase the conversation pause time threshold as the number of people involved in the conversation decreases.

In an embodiment, the control module 103 may increase the conversation exchange frequency threshold and decrease the conversation pause time threshold as the user emotion parameter indicates that a user is happy.

In an embodiment, the control module 103 may increase the conversation exchange frequency threshold and decrease the conversation pause time threshold when the user emotion parameter indicates that a user is angry.

In an embodiment, the control module 103 may increase the conversation exchange frequency threshold and decrease the conversation pause time threshold as the user emotion parameter indicates that a user is scared.

In an embodiment, the control module 103 may decrease the conversation exchange frequency threshold and increase the conversation pause time threshold as the user emotion parameter indicates that a user is sad.

In an embodiment, the control module 103 may increase the conversation exchange frequency threshold and decrease the conversation pause time threshold as the user character parameter indicates that a user is talkative.

In an embodiment, the control module 103 may decrease the conversation exchange frequency threshold and increase the conversation pause time threshold as the user character parameter indicates that the user is not talkative.

In an embodiment, the control module 103 may increase the conversation exchange frequency threshold and decrease the conversation pause time threshold as the user character parameter indicates that a user speaks fast.

In an embodiment, the control module 103 may decrease the conversation exchange frequency threshold and increase the conversation pause time threshold as the user character parameter indicates that the user speaks slowly.

In an embodiment, when the number of people involved in the conversation is greater than a preset threshold, the control module 103 may configure the conversation pause time threshold as a value sufficient to determine that timing has not arrived yet; when the number of people involved in the conversation is greater than a preset threshold, the control module 103 may configure the conversation exchange frequency threshold as a value sufficient to determine that timing has not arrived yet.

In an embodiment, when a level (intensity) of the user emotion parameter indicates high, the control module 103 may configure the conversation pause time threshold as a value sufficient to determine that timing has not arrived yet.

In an embodiment, when a level (intensity) of the user emotion parameter indicates high, the control module 103 may configure the conversation exchange frequency threshold as a value sufficient to determine that timing has not arrived yet.

In an embodiment, when the number of people involved in the conversation is less than or equal to a preset threshold, and the level of the user emotion parameter indicates normal, the control module 103 may calculate a weighted value of the user character parameter, the user emotion parameter, and the number of people involved in the conversation, and adjust the conversation exchange frequency threshold based on the weighted value.

In an embodiment, when the number of people involved in the conversation is less than or equal to the preset threshold, and the level of the user emotion parameter indicates normal, the control module 103 may calculate a weighted value of the user character parameter, the user emotion parameter, and the number of people involved in the conversation, and adjust the conversation pause time threshold based on the weighted value.

In an embodiment, the control module 103 may adjust the conversation pause time or conversation exchange frequency based on the number of people involved in the conversation, the user emotion parameter, or the user character parameter, so that the intervention timing may be adjusted based on the number of people involved in the conversation, the user emotion parameter, or the user character parameter, to realize active intervention more in line with user features.

In an embodiment, the analysis module 102 may be further configured to classify a scenario of the conversation based on the voice data and the text data. The control module 103 may be further configured to determine the conversation pause time threshold and/or the conversation exchange frequency threshold based on a scenario classification result, and determine, based on the scenario classification result, whether to adjust the conversation pause time threshold and/or the conversation exchange frequency threshold based on the number of people involved in the conversation, the user emotion parameter, or the user character parameter.

In an embodiment, the analysis module 102 may be configured to determine a conversation structure of the conversation and fixedness of a topic keyword (that is, whether a topic of the conversation changes) based on the text data; determine an interaction rhythm based on a waveform of the voice data; and classify the scenario of the conversation based on the conversation structure, the fixedness of the topic keyword and the interaction rhythm.

In an embodiment, when the scenario classification result indicates that the conversation is a chat type conversation, the control module 103 may be configured to determine to adjust the conversation pause time threshold and/or the conversation exchange frequency threshold based on the number of people involved in the conversation, the user emotion parameter, or the user character parameter.

In an embodiment, when the scenario classification result indicates that the conversation is a Q&A discussion type conversation, the control module may be configured to determine not to adjust the conversation pause time threshold and/or the conversation exchange frequency threshold based on the number of people involved in the conversation, the user emotion parameter, or the user character parameter.

In an embodiment, when the scenario classification result indicates that a fixed conversation program type conversation, the control module may be configured to determine not to adjust the conversation pause time threshold and/or the conversation exchange frequency threshold based on the number of people involved in the conversation, the user emotion parameter, or the user character parameter.

In an embodiment, the monitoring module 101 may be further configured to identify a user based on a voiceprint feature of the voice data, and match the voice data and text data with the identified user.

According to an embodiment, scenario characteristics of the multi-user conversation may be analyzed and classified as a chat type, a Q&A discussion type, and a fixed conversation program type conversation based on the conversation structure, the interaction rhythm, and a feature representation result of a conversation topic in a long-distance conversation and a single-round conversation; and scenario features of the three types may be and extracted. When analyzing the multi-user conversation scenario, the features of three types may be integrated to determine a type to which the multi-user conversation scenario belongs. Moreover, a running mode of voice interaction may be further defined to ensure that the voice interaction apparatus is adapted to different application scenarios. In different modes, conversation content may be monitored and recorded, a logic for determining a form of a feedback content and determining intervention timing may be changed to satisfy various scenario requirements.

In an embodiment, the monitoring module 101, the analysis module 102, and the control module 103 may be integrated in a single entity; or the monitoring module 101 may be deployed in a first entity, and the analysis module 102 and the control module 103 may be deployed in a cloud; or the monitoring module 101 and the analysis module 102 may be deployed in a first entity, and the control module 103 may be deployed in a cloud; or the monitoring module 101 and the control module 103 may be deployed in a first entity, and the analysis module 102 may be deployed in may be deployed in a cloud.

In example 1, the monitoring module 101, the analysis module 102, and the control module 103 may be integrated in a smart device such as a smart speaker, a smart TV, or a smart phone.

In example 2, the monitoring module 101 may be deployed in a smart device such as a smart speaker, a smart TV, or a smart phone, and the analysis module 102 and the control module 103 may be deployed in a cloud accessible by the smart device.

In example 3, the monitoring module 101 and the analysis module 102 may be deployed in a smart device such as a smart speaker, a smart TV, or a smart phone, and the control module 103 may be deployed in a cloud accessible by the smart device.

In example 4, the monitoring module 101 and the control module 103 are deployed in a smart device such as a smart speaker, a smart TV, or a smart phone, and the analysis module 102 may be deployed in a cloud accessible by the smart device.

The specific deployment configuration of the monitoring module 101, the analysis module 102, and the control module 103 are described above. Those skilled in the art may realize that this description is only exemplary, and is not used to limit a scope of the embodiments.

The voice interaction may be implemented by more or fewer units (or modules) than those described herein according to embodiments. In the disclosure, modules of the voice interaction apparatus are named to distinctively explain their operations which are performed by the modules in the voice interaction apparatus. Thus, it should be understood that such operations are performed according to an embodiment and should not be interpreted as limiting a role or a function of the modules. For example, an operation which is described herein as being performed by a certain module of the voice interaction apparatus may be performed by another module or other modules of the voice interaction apparatus, and an operation which is described herein as being performed by interaction between modules of the voice interaction apparatus or their interactive processing may be performed by one module of the voice interaction apparatus. Furthermore, an operation which is described herein as being performed by the voice interaction apparatus may be performed by another device or may be performed by aid of the other device.

The voice interaction apparatus may include a memory (storage) and a processor. Software modules of the voice interaction apparatus such as program modules may be stored in the memory as a collection of instructions, and the instructions may be executed by the processor to perform corresponding functions.

Figure 2:
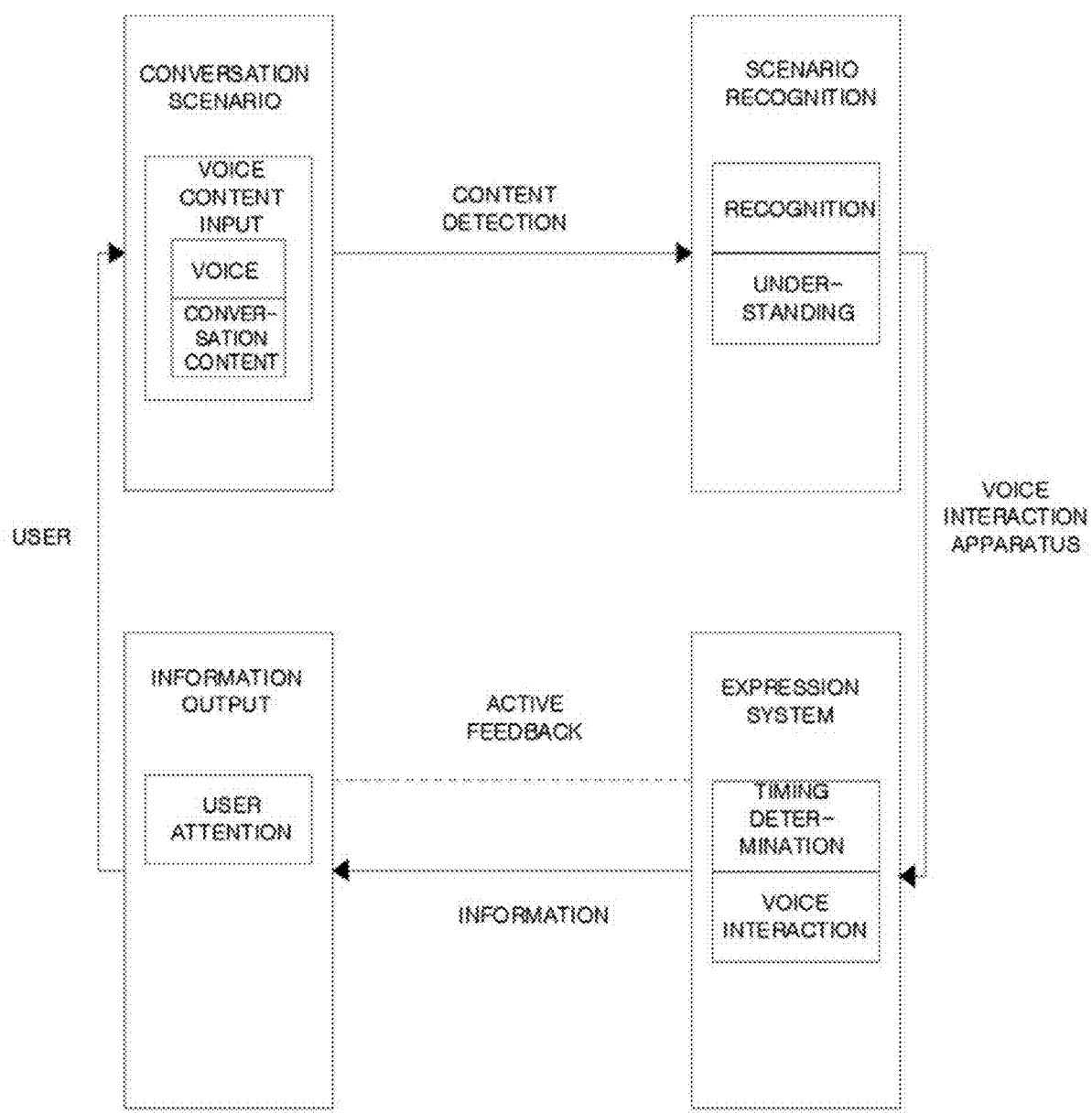
FIG. 2 is an exemplary schematic diagram of a voice interaction according to an embodiment.
Figure 3:
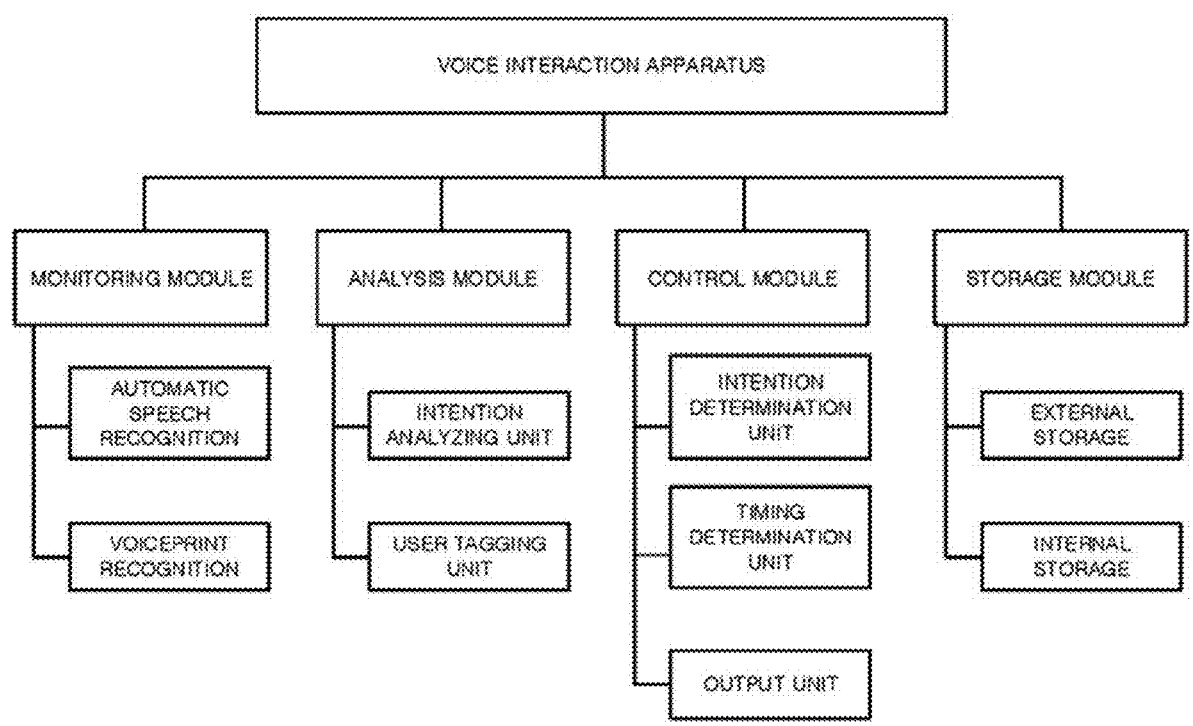
FIG. 3 is an exemplary schematic diagram of modules of a voice interaction apparatus according to an embodiment.

FIG. 2 is an exemplary schematic diagram of a voice interaction according to an embodiment. FIG. 3 is an exemplary schematic diagram of modules of a voice interaction apparatus according to an embodiment.

In FIG. 2, the voice interaction apparatus may include a monitoring module, an analysis module, a control module, and a storage module, but is not limited thereto.

A unit (module) of the voice interaction apparatus may include a subordinate unit (subordinate module). The module may include more or fewer subordinate units than those described herein. In the disclosure, subordinate units of the voice interaction apparatus are named to distinctively explain their operations which are performed by the voice interaction apparatus. Thus, it should be understood that such operations are performed according to an embodiment and should not be interpreted as limiting a role or a function of the subordinate units. A module and a subordinate unit may be in a hierarchy relation, or may be not in the hierarchy relation.

The monitoring module may include an automatic speech recognition (ASR) unit and a voiceprint recognition unit. The ASR unit may monitor the user conversation from beginning to end, converts the monitored user voice data into text data, and stores the text data for subsequent calling and analysis by another module; the voiceprint recognition unit recognizes a voice feature of the user.

The analysis module may include an intention analyzing unit and a multi-user identification unit. The multi-user identification unit may be referred to as a multi-user tagging unit. That is, identifying a user may correspond to tagging the user according to characteristics of the user The intention analyzing unit may perform semantic understanding and intention analysis on the text data of the user, analyze intention required by the user in a current state. When the voiceprint recognition unit detects the user based on voiceprint recognition technology, the multi-user identification unit may identify the number of users, gender, an age range and a corresponding emotion characteristic based on a voiceprint characteristic. Here, the multi-user identification unit may use features extracted from a voice of a user to train one or more models, and the trained models may be stored in a model library. Features may be extracted from a received audio and then entered into the stored models in the model library to determine who is speaking (determine a speaker).

The control module may include an intention determination unit, a timing determination unit, and an output unit. The intention determination unit may determine whether any information (question or request) for the intelligent voice assistant to answer is included in a conversation of users, the information may include control information, knowledge search, etc., but is not limited thereto. The timing determination unit may be configured to determine a scenario of the multi-user conversation, and determine a state of the scenario of the multi-user conversation according to corresponding data of a change in a conversation exchange frequency and voice conversation pause time. The output unit may determine whether to perform an operation after obtaining a specific analysis result, select content to be output according to a situation, and output the selected content. The output unit may wait until timing to output comes, and then output the selected content when timing to output has come.

The storage module may include an internal storage and an external storage. The internal storage may organize and store data of the voice interaction apparatus such as a source instruction, a database, historical voice information, and an analysis result to transfer them to another module at any time; the external storage may be implemented as an external cloud server, which may provide a feedback content corresponding to the user intention.

In an embodiment, a condition for actively intervening in a conversation may be defined from two aspects including timing for actively intervening in the conversation of the scenario and a feedback to multi-user intention without an explicit instruction from the user. In this case, the timing for actively intervening in the conversation may be determined according to a preset behavior mode in order to realize natural and active interaction in a system.

Preferably, the voice interaction apparatus may be implemented based on the Session-Oriented framework according to the embodiment.

In summary, the embodiments disclose a technical solution for intelligent voice active interaction in a multi-user conversation scenario based on the Session-Oriented framework, which may monitor the multi-user conversation from the beginning to the end and select an appropriate timing to perform active interaction, such as, to intervene in conversation. The monitoring module of the voice interaction apparatus may continuously monitor the user conversation. A voice text conversion unit may convert voice information into text, and store the text for analysis; the voiceprint recognition unit may identify a user after recognizing a voice feature of the user, and then match content with the user. The analysis module of the voice interaction apparatus may include a semantic recognition unit, an intention analyzing unit, and a multi-user identification unit. After understanding the voice information of the user, the intention analyzing unit may analyze intention required by the user in a current state, and retrieve a corresponding feedback content according to the analyzed intention. The multi-user identification unit may identify the number of users, gender, an age range and a corresponding emotion characteristic based on a voiceprint characteristic of a user when the user is detected through voiceprint recognition. Here, the multi-user identification unit may monitor the conversation from the beginning to the end, use features extracted from a voice of a user to train one or more models, and the trained models may be stored in a model library. Features may be extracted from a received audio and then entered into the stored models in the model library for comparison to determine who is speaking (determine a speaker). The control module of the voice interaction apparatus may include an intention determination unit, a timing determination unit, and an output unit. The intention determination unit may be configured to determine whether any information (question or request) for the intelligent voice assistant to answer is included in a conversation of users according to a result of the semantic analysis, the information may include control information, knowledge text and search, etc., but is not limited thereto. The timing determination unit may be configured to determine a scenario of the multi-user conversation, and determine a mode or state of the multi-user conversation scenario according to corresponding data of a change in an exchange frequency between users and duration of voice conversation pause time. The output unit may select content according to a situation and then output the selected content, or may wait until intervention timing arrives and then output the selected content.

In an embodiment, a multi-user conversation scenario conversation may be classified to a plurality of modes according to an interaction rhythm and fixedness of a topic of the conversation. For example, the multi-user conversation scenario conversation may be classified into three main categories, such as, a chat type conversation, a Q&A discussion type conversation, and a fixed conversation program type conversation, but is not limited thereto. The multi-user identification may be implemented by using Gaussian Mixture Model-Universal Background Model (GMM-UBM) voiceprint recognition. Further, the multi-user identification may be realized by further combining various technologies such as image information acquisition, face recognition, mouth movement, acoustic positioning and the like.

In an embodiment, after the voice analysis is performed for the user, intention of the user may be finally obtained by using a neural network (TextCNN). Further, other various methods such as machine learning, rule judgment, and fuzzy matching may be used to obtain the intention of the user. In addition, the determination of the active intervention timing in a multi-user conversation scenario includes, but is not limited to, detecting the pause time of the conversation between users, combining a change in the conversation exchange frequency, an emotion tone of the conversation, and a logic synthesis of a preset program together to determine the active intervention timing. In an embodiment, a machine may actively determine the current conversation scenario, and a device action mode or conversation mode corresponding to the scenario may be predetermined. The conversation mode or activity mode may include a life mode, an education mode, a game mode, but is not limited thereto. In an embodiment, a strategy for determining the timing to intervene in the conversation by the intelligent device (including a baseline, a basic rule for timing determination, and timing adjustment) and a strategy for determining a form of the feedback content in a corresponding mode.

In an embodiment, it is preferable to use voice activity detection (VAD) technology to detect the pause time and the exchange frequency in the multi-user conversation. Voice activity detection (VAD) may be performed based on energy and a zero-crossing rate. The pause time and the exchange frequency in the multi-user conversation may be detected using various methods such as frequency domain analysis, cepstrum analysis, harmonic analysis, long time information, etc. In addition, in an embodiment, it is preferable to adopt a machine learning algorithm to realize supervised learning of the active intervention timing in order for determining intervention timing according to a conversation scenario and for identifying a request corresponding to an intention of a user. Optionally, various technologies such as deep learning, rule judgment, and fuzzy matching may also be used.

Figure 4:
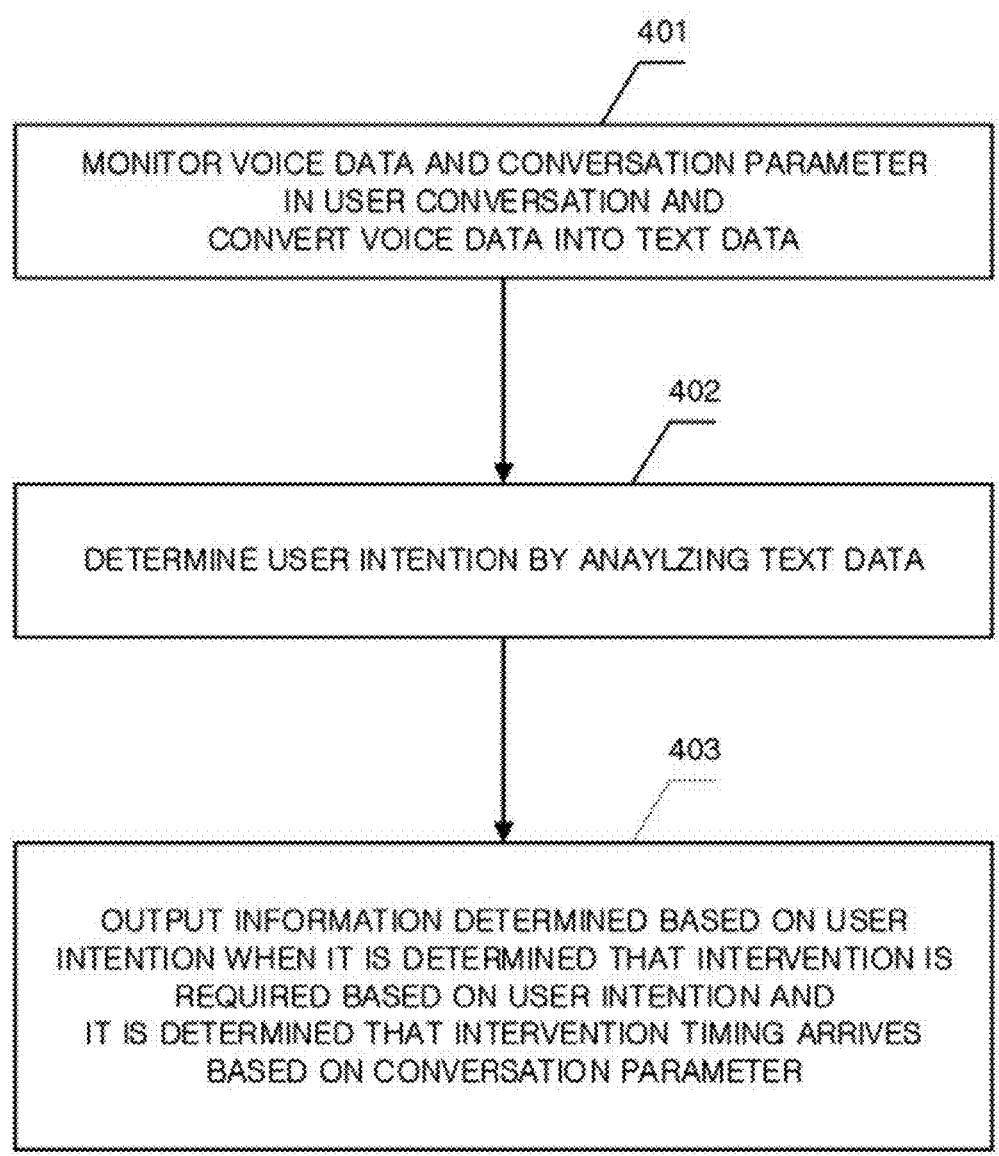
FIG. 4 is a flowchart of a voice interaction method according to an embodiment.

FIG. 4 is a flowchart of a voice interaction method according to an embodiment.

As shown in FIG. 4, the method may include operations 401, 402, and 403, but is not limited thereto, and may include more or fewer operations than that, each operation may be split into a plurality of subordinate-operations or integrated into one superordinate operation.

At operation 401, voice data and a conversation parameter in a user conversation may be monitored, and the voice data may be converted into text data.

At operation 402, the voice interaction apparatus may analyze the text data to determine a user intention.

At step 403: when it is determined that there is an intervention requirement based on the user intention and it is determined that intervention timing arrives based on the conversation parameter, information determined based on the user intention, such as an answer to the user's inquiry, may be sent to the user.

In an embodiment, the conversation parameter may include: at least one of: a conversation pause time; a conversation exchange frequency; the number of people involved in the conversation; a user emotion parameter; or a user character parameter, but is not limited thereto.

In an embodiment, the conversation parameter may include a conversation pause time and/or a conversation exchange frequency. The conversation pause time and/or the conversation exchange frequency may be a condition for the voice interaction apparatus to intervene in the conversation of the users. For example, it may be determined that it is timing to intervene in a conversation of users when the conversation pause time is greater than a conversation pause time threshold and/or the conversation exchange frequency is less than a conversation exchange frequency threshold. For example, it may be determined that it is timing to intervene in a conversation of users when the conversation pause time is less than a conversation pause time threshold and/or the conversation exchange frequency is greater than a conversation exchange frequency threshold. The voice interaction apparatus may intervene in the conversation between users when it is determined that it is timing to intervene in the conversation. For example, the voice interaction apparatus may provide the user with a feedback or answer corresponding to the intention of the user recognized during the conversation of the users.

In an embodiment, the conversation parameter may further include the number of people involved in the conversation, the user emotion parameter or the user character parameter. The method further includes: adjusting the conversation pause time threshold and/or the conversation exchange frequency threshold based on the number of people involved in the conversation, the user emotion parameter or the user character parameter.

In an embodiment, the conversation pause time and/or conversation exchange frequency may be adjusted based on the number of people involved in the conversation, the user emotion parameter, or the user character parameter.

For example, the control module may increase the conversation exchange frequency threshold and decrease the conversation pause time threshold as the number of people involved in the conversation increases.

For example, the control module may decrease the conversation exchange frequency threshold and increase the conversation pause time threshold as the number of people involved in the conversation decreases.

For example, the control module may increase the conversation exchange frequency threshold and decrease the conversation pause time threshold as the user emotion parameter indicates that a user is happy.

For example, the control module may increase the conversation exchange frequency threshold and decrease the conversation pause time threshold when the user emotion parameter indicates that a user is angry.

For example, the control module may increase the conversation exchange frequency threshold and decrease the conversation pause time threshold as the user emotion parameter indicates that a user is scared.

For example, the control module may decrease the conversation exchange frequency threshold and increase the conversation pause time threshold as the user emotion parameter indicates that a user is sad.

For example, the control module may increase the conversation exchange frequency threshold and decrease the conversation pause time threshold as the user character parameter indicates that a user is talkative.

For example, the control module may decrease the conversation exchange frequency threshold and increase the conversation pause time threshold as the user character parameter indicates that the user is not talkative.

For example, the control module may increase the conversation exchange frequency threshold and decrease the conversation pause time threshold as the user character parameter indicates that a user speaks fast.

For example, the control module may decrease the conversation exchange frequency threshold and increase the conversation pause time threshold as the user character parameter indicates that the user speaks slowly.

For example, when the number of people involved in the conversation is greater than a preset threshold, a voice interaction apparatus may configure the conversation pause time threshold as a value sufficient to determine that timing has not arrived yet; For example, when the number of people involved in the conversation is greater than a preset threshold, the control module may configure the conversation exchange frequency threshold as a value sufficient to determine that timing has not arrived yet.

For example, when a level (intensity) of the user emotion parameter indicates high, the control module may configure the conversation pause time threshold as a value sufficient to determine that timing has not arrived yet.

For example, when a level (intensity) of the user emotion parameter indicates high, the control module may configure the conversation exchange frequency threshold as a value sufficient to determine that timing has not arrived yet.

For example, when the number of people involved in the conversation is less than or equal to a preset threshold, and the level of the user emotion parameter indicates normal, the control module may calculate a weighted value of the user character parameter, the user emotion parameter, and the number of people involved in the conversation, and adjust the conversation exchange frequency threshold based on the weighted value.

For example, when the number of people involved in the conversation is less than or equal to the preset threshold, and the level of the user emotion parameter indicates normal, the control module may calculate a weighted value of the user character parameter, the user emotion parameter, and the number of people involved in the conversation, and adjust the conversation pause time threshold based on the weighted value.

In one embodiment, the voice interaction method includes: classifying a scenario of the conversation based on the voice data and text data; determining a conversation pause time threshold and/or a conversation exchange frequency threshold based on a scenario classification result, determining based on the scenario classification result, whether to adjust the conversation pause time threshold and/or the conversation exchange frequency threshold based on the number of people involved in the conversation, the user emotion parameter or the user character parameter. The voice interaction method may be performed at the voice interaction apparatus, but is not limited thereto.

In an embodiment, the classifying a scenario of the conversation based on the voice data and the text data includes: determining a conversation structure of the conversation and fixedness of a topic keyword (that is, whether a topic of the conversation changes) based on the text data; determining an interaction rhythm based on a waveform of the voice data; and classifying the scenario of the conversation based on the conversation structure, the fixedness of the topic keyword and the interaction rhythm.

In an embodiment, whether to adjust the conversation pause time and/or the conversation exchange frequency may vary according to a scenario classification result, but is not limited thereto. For example, the conversation of the users may be classified as a chat type conversation based on the scenario classification result, the conversation pause time and/or conversation exchange frequency may be adjusted based on the number of people participating in the chat type conversation, the user emotion parameter, or the user character parameter. For example, the conversation of the users may be classified as a Q&A discussion type conversation based on the scenario classification result, it may be determined not to adjust the conversation pause time and/or conversation exchange frequency based on the number of people participating in the Q&A discussion type conversation, the user emotion parameter, or the user character parameter. For example, the conversation of the users may be classified as a fixed conversation program type conversation based on the scenario classification result, it may be determined not to adjust the conversation pause time and/or conversation exchange frequency based on the number of people participating in the fixed conversation program type conversation, the user emotion parameter, or the user character parameter.

In one embodiment, the voice interaction method includes: identifying a user based on a voiceprint feature of the voice data, and matching the voice data and the text data with the identified user. The voice interaction method may be performed at the voice interaction apparatus, but is not limited thereto.

The specific implementation of the embodiments is described in more detail below.

In an embodiment, the voice interaction apparatus may monitor a current conversation sentence of the user, the voice interaction apparatus determines whether the sentence includes a direct voice instruction of the user, and a feedback may be timely provided to the user from the voice interaction apparatus based on the context of the direct voice instruction.

According to an embodiment, the proper timing for the voice interaction apparatus to actively intervene in the conversation users may be determined so an active and natural interaction may be realized based on understanding intentions of users.

Figure 5:
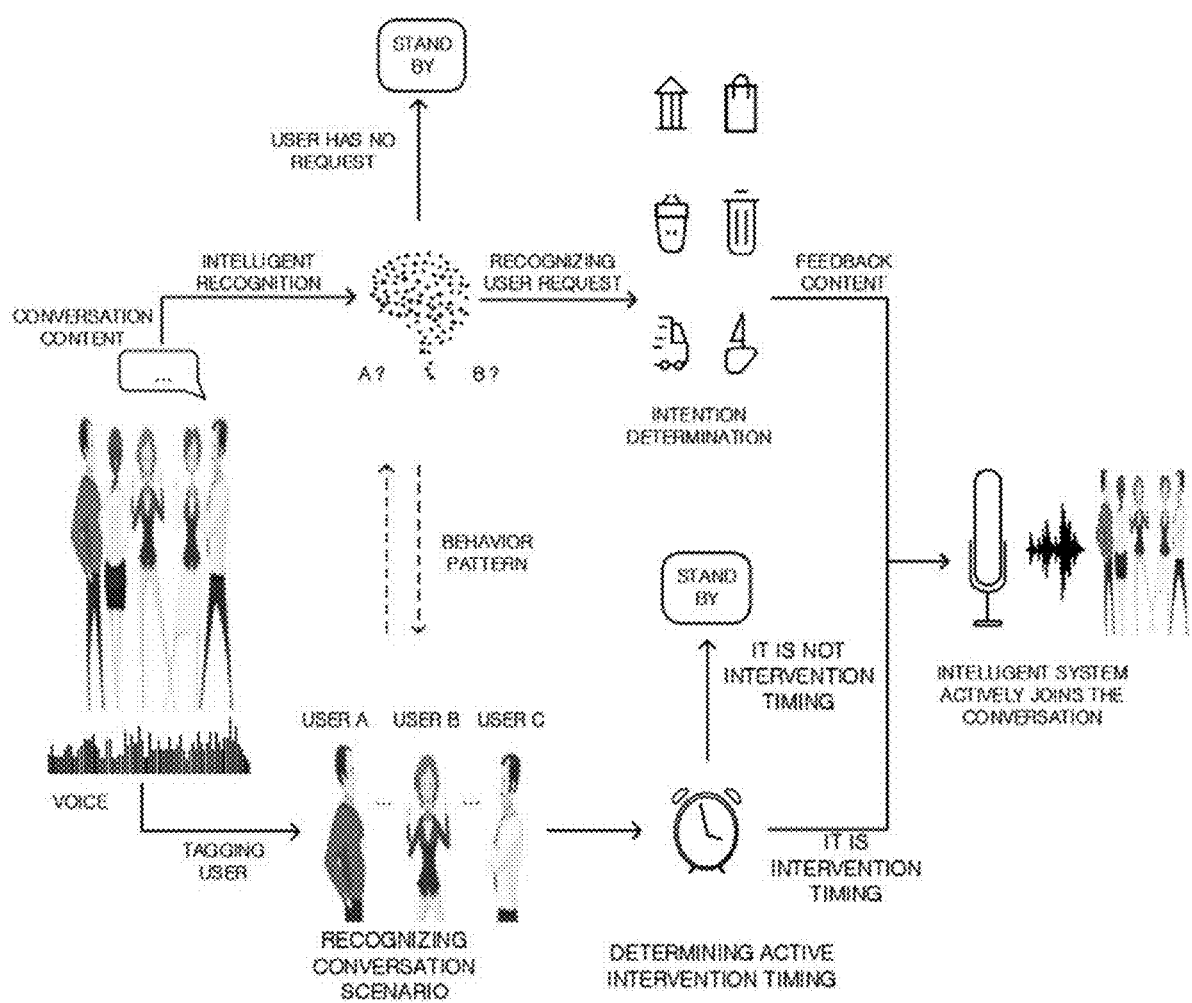
FIG. 5 is an exemplary and conceptual flowchart of a voice interaction process according to an embodiment.

Determining timing for intervening in a conversation is explained by referring to FIG. 5.

FIG. 5 is an exemplary and conceptual flowchart of a voice interaction process according to an embodiment.

In an embodiment, by analyzing a multi-user conversation, a scenario feature of the conversation may be extracted and learned, and the scenario feature may be learned by a model to classify a multi-user conversation into a certain conversation scenario. For example, the multi-user conversation scenario conversation may include a chat type conversation, a Q&A discussion type conversation, and a fixed conversation program type conversation, but is not limited thereto. In an embodiment, features of the conversation scenario may be extracted and learned based on a conversation structure, an interaction rhythm, a feature representation result of a conversation topic in a long-distance conversation and a single-round conversation. A category of the multi-user conversation scenario may be determined by using a model trained with scenario features.

FIG. 6 is a schematic diagram of scenario classification according to an embodiment. It can be seen that through technologies such as voiceprint recognition, voice recognition and the like, user identification may be performed to determine the number of people in the scenario and the regularity of the conversation. Identifying a user may include tagging the user. The conversation rhythm in the scenario may be determined by analyzing a voice waveform characteristic of the conversation scenario. In addition, a voice content keyword may be tagged according to the semantic understanding technology to determine the topic of the conversation.

Next, an embodiment defines a running mode of the active interaction to ensure that it may better adapt to different application scenarios. In different modes, the voice interaction apparatus monitors and records conversation content, in which a form of feedback content and determining logic of intervention time may be different.

In the disclosure, a baseline indicates a function as a standard of determining intervention timing in a corresponding mode. A basic rule for timing determination may indicate characteristic of a conversation, condition, etc., when the apparatus determines timing to intervene in the conversation. Timing adjustment may affect a function experienced by the user in this conversation, so that the system may adjust the intervention timing according to the timing adjustment. Feedback content defines what kinds of alternatives the feedback method in a corresponding mode to be proposed, and the nature of the feedback content being different may originate from different servers (internal/external).

Table 1 explains in detail a machine behavior mode rule in different modes.

users. The default number may be established as a standard to adjust the conversation pause time and/or the conversation exchange frequency threshold. For example, when the number of users is greater than 2, the conversation pause time threshold and/or the conversation exchange frequency threshold may be adjusted in order to make it easier for the voice interaction apparatus to intervene in the conversation of the users.

Besides, characteristic feature of a speaker indicated by a user character parameter or user emotion parameter may affect a conversation scenario. Therefore, in order to maintain balance of participation of individuals in a multi-user conversation, intervention timing may be determined for each user by tagging users, and feedback content may be provided based on each user, which will be explained by referring to FIG. 8.

Figure 8:
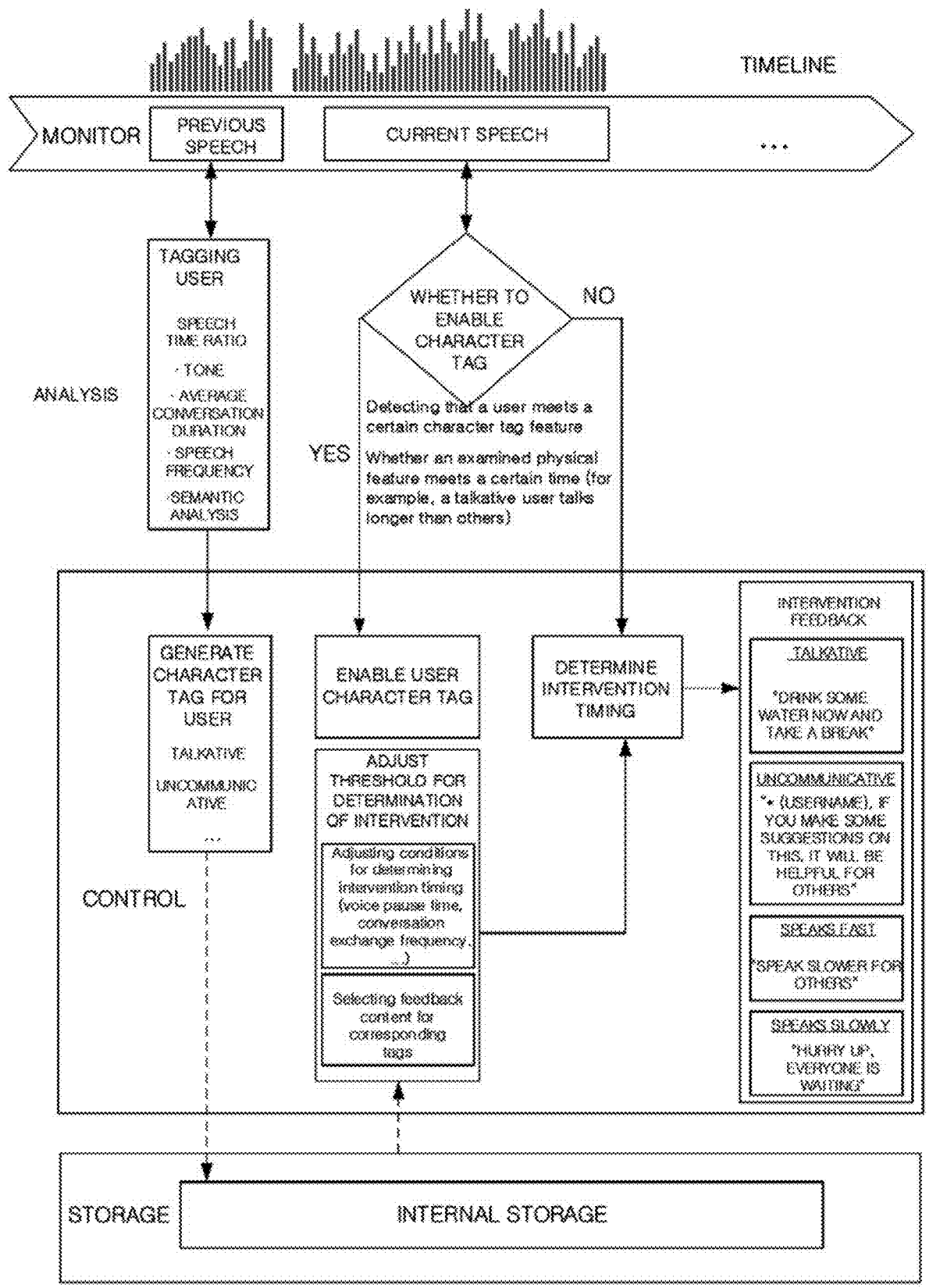
FIG. 8 is a schematic diagram of a user feature according to an embodiment.

FIG. 8 is a schematic diagram of tagging a user feature according to an embodiment. It can be seen that a feature of

TABLE 1

| | | | timing determination strategy | | | |
|---|---|---|---|---|---|---|
| Scenario | Behavior mode | Topic example | Baseline | Basic rule for timing determination | timing adjustment | Feedback content |
| Daily chat type | Life mode | Weather, food, clothes, voltage, music, sports, etc. | Interrogative sentence, intentions | conversation intervention time, conversation exchange frequency | Emotion, the number of users, typical character | Application activity, content recommendation |
| Q&A type | Education Mode | Encyclopedia, Mathematics, Poetry, Literature, History, etc. | Question library | conversation intervention time, conversation exchange frequency | — | Questions and Answers |
| fixed conversation program | Game mode | Party game | Game progress | Game progress, exchange frequency | Number of users | Game character conversation |

Table 1 describes different rules for determining timing, different timing adjustment factors, and different feedback content in different conversation scenarios. According to an embodiment, a result of determination of appropriate timing for active intervention of a system may vary according to a conversation scenario. The monitoring module may detect a relationship between corresponding parameters and a preset rule, so as to determine appropriate active intervention timing.

In an embodiment, a chat-type conversation scenario may become complicated as the number of users increases, so it may be difficult for AI to intervene the conversation. It may be difficult for AI to determine proper timing to intervene in the conversation. Therefore, in order to prevent the possibility of the device from being activated in such cases being too low, the number of people involved in the conversation may be used as a factor for determining intervention timing.

Figure 7:
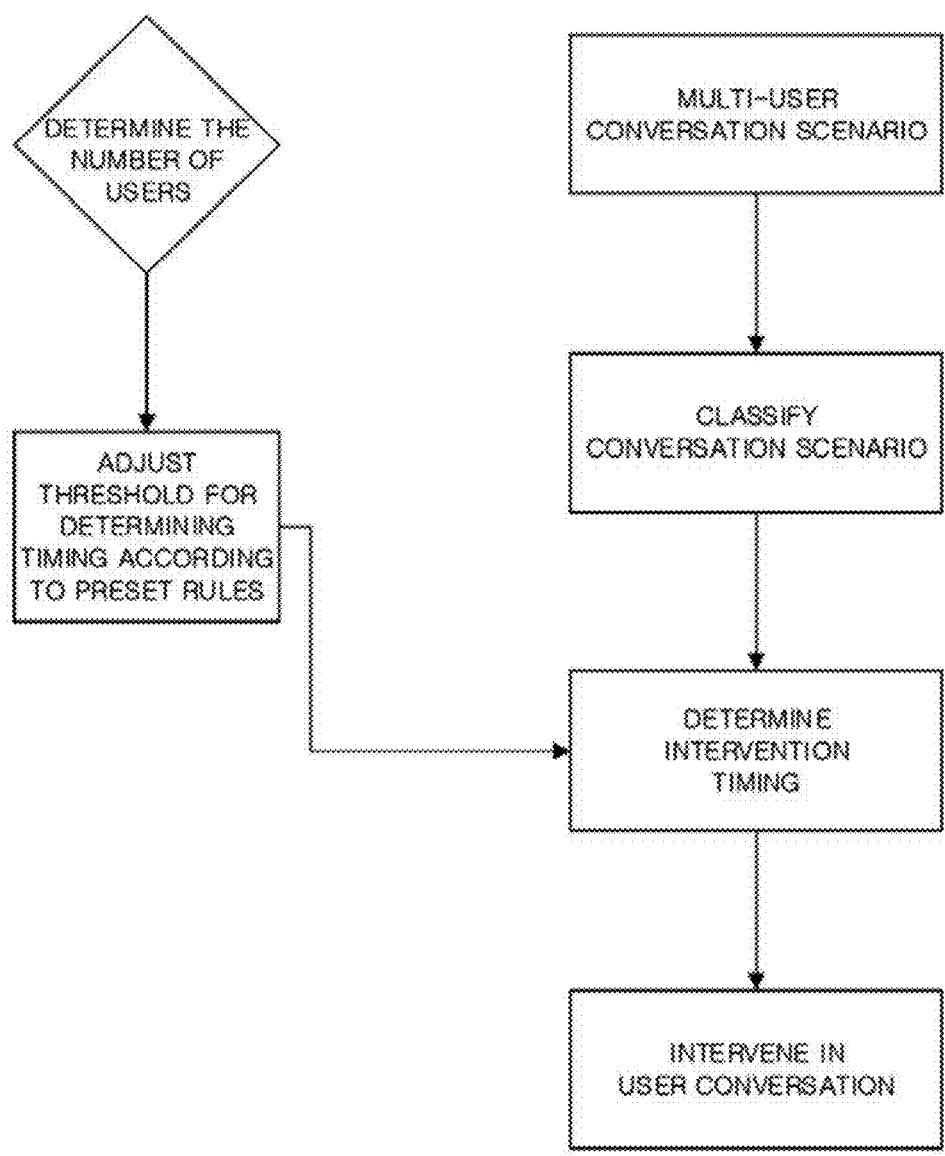
FIG. 7 is a schematic diagram of an effect of the number of users on a threshold according to an embodiment.

FIG. 7 is a schematic diagram of an effect of the number of users on a threshold according to an embodiment.

In an embodiment, 1:2 may be set as a default ratio (or default number) of the voice interaction apparatuses and the user may be tagged by analyzing a voice of the user and voice content; The conversation pause time threshold and/or the conversation exchange frequency threshold may be adjusted according to a tag so as to achieve a balanced wake-up ratio between users. For example, preset feedback may be provided to a certain user to smoothen the conversation.

In an embodiment, mutual interaction and tangle of user emotion in a multi-user conversation scenario may affect an overall performance of smoothening the entire conversation. According to an embodiment, active intervention timing of the voice intervention apparatus in a multi-user conversation scenario may be adjusted according to emotion tone of users. Emotion parameter of users may be used to adjust a determining condition for the active intervention timing in the conversation scenario to improve the user experience of the voice interaction apparatus in the multi-user conversation scenario. By referring to relevant research results, the influence of a basic emotion on a parameter of the machine for determining the active intervention timing is defined, and another conforming emotion may be referenced after disassembly.

Table 2 describes impact of user emotion on determination of timing.

TABLE 2

| Emotion | happy | angry | sad | scared |
|---|---|---|---|---|
| conversation pause time | Decrease | significantly decreased | significantly increased | Increase |
| conversation exchange frequency | speeded up | significantly speeded up | significantly slowed down | slowed down |

As shown in Table 2, when a user is at a certain emotion state, the conversation pause time and the conversation exchange frequency have tendency to be inversely proportional. In an embodiment, the conversation pause time threshold and the conversation exchange frequency threshold may be inversely adjusted. For example, when an angry user is participating in a conversation, the conversation pause time may be generally decreased, and the conversation exchange frequency per a unit time may be generally increased. If the voice interaction apparatus intervenes in the conversation of users without considering emotion states of users, the users may be more uncomfortable due to indiscreet intervention of the voice interaction apparatus. In an embodiment, the conversation pause time threshold and the conversation exchange frequency threshold are adjusted based on an emotion parameter of a user, so the voice interaction apparatus may intervene in the conversation at the right timing. The conversation pause time threshold and the conversation exchange frequency threshold may be inversely adjusted, that is, if either one is increased then another one may be decreased. As shown in Table 2, the conversation pause time and the conversation exchange frequency move in opposite direction based on emotion states of users, so the voice interaction apparatus may increase either one of the conversation pause time threshold and the conversation exchange frequency threshold while decreasing another one.

In an embodiment, the voice interaction apparatus may determine whether there is proper content corresponding to intention of a user to return the content to a user when an intervention timing condition is satisfied.

When voice data or text data directly corresponding to a voice command of a user is not detected from the user's voice, the voice interaction apparatus may analyze intention of the user in the conversation of users and tag key information to predict, in real-time, assistance and related information that the user may need, accordingly, active intelligent assistant may be achieved.

In an embodiment, grammar of voice input content (or text content converted from the voice input content) may be analyzed in order to analyze the intention of the user. For example, as shown in Table 3, whether a interrogative word such as what, how, where, why, etc. is detected in the voice input content (or the text content) may be monitored. For example, as shown in Table 3, whether a keyword for asking for help, for example, "I don't know," "I don't understand," "How about it?" "I want to . . . ," "I don't remember," "I forgot about it," etc. is detected may be monitored.

In an embodiment, whether a user is curious about something may be learned through voice recognition. In an embodiment, a related keyword is preset or determined to be tagged as an information point for analyzing the intention of the user, and a request of the user may be derived from calculating the point. At the same time, the user emotion in the conversation may be analyzed, and an emotion factor may be used as an intervention timing adjustment baseline to adjust a state of the scenario to make the user experience better.

Table 3 is a schematic table of intention keywords.

TABLE 3

| Express question | Express asking for help | Express demand |
|---|---|---|
| "what", "how", "where", "why", "how about it", "?" . . . | "don't know", "don't understand", "unclear", "do not", "do not understand", "can't hear", "can't see" . . . | play, eat, see, think, go, come, . . . |

About decision-making and determination of the voice interaction apparatus actively intervening in the user conversation: timing determination may be performed through classification of multi-user conversation scenario, detection of pause time and exchange frequency of the user conversation, and emotion recognition; the user demand may be understood through intention analysis to provide appropriate feedback content. Ultimately, the voice interaction apparatus determines, and selects an appropriate timing to actively participate in the user conversation. Whether to finally participate in the user conversation may be determined by two main condition. One of the two main condition may be that intervention in a conversation is not to interrupt general conversation request between users, but is not limited thereto. Another one of the two main condition is that a request of a user who wants to obtain information is detected, and it is detected that the voice interaction apparatus has proper feedback contention to be provided to the user, but is not limited thereto.

Figure 9:
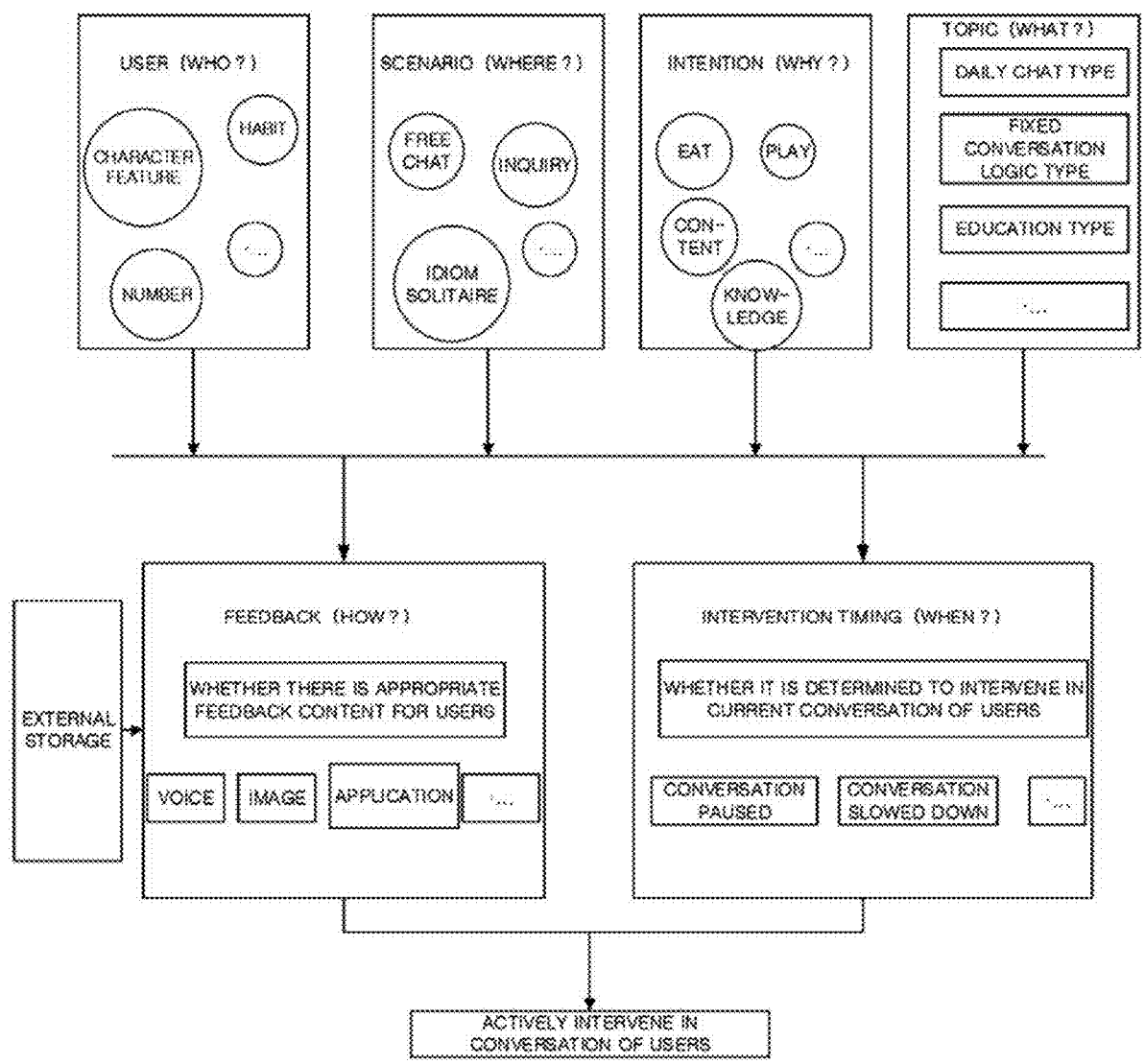
FIG. 9 is a schematic diagram of a strategy for an active interaction according to an embodiment.
Figure 10:
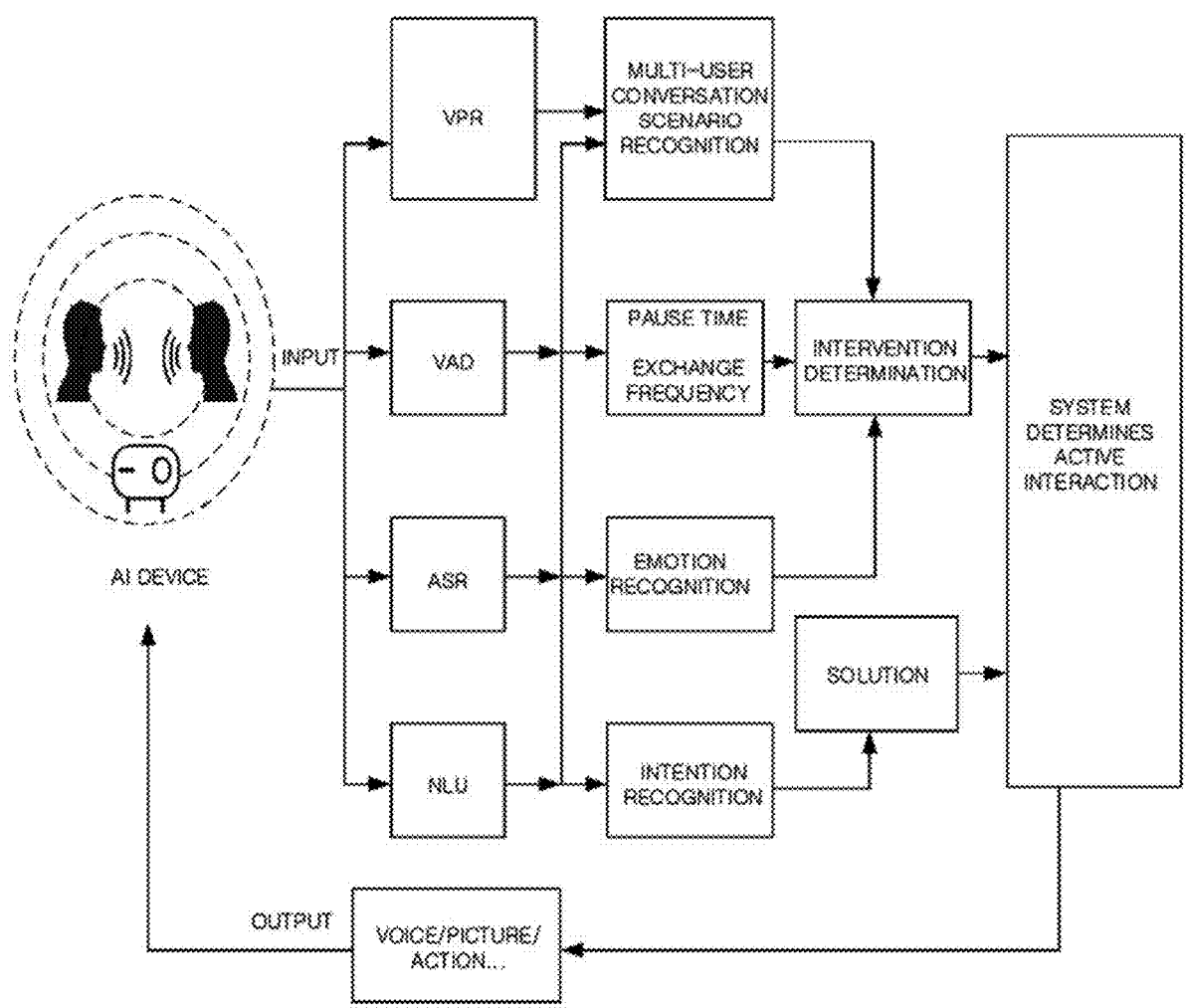
FIG. 10 is a diagram of architecture for an active interaction according to an embodiment.

FIG. 9 is a schematic diagram of a strategy for an active interaction according to an embodiment. FIG. 10 is a diagram of architecture for an active interaction according to an embodiment.

An embodiment implements an intelligent interaction on the basis of existing technologies such as voiceprint recognition (VPR), voice activity detection (VAD), automatic speech recognition (ASR), natural language understanding (NLU), and the like. Functions mainly may include multi-user recognition for scenarios analysis, VAD voice detection technology for detecting a conversation feature, technology for analyzing user emotions and intentions, and system decision-making technology for implementing timing determination and active interaction.

A sound feature of the user voice information in a multi-user conversation scenario may be obtained using voice recognition technology, and the sound feature may include a speech speed, intonation, conversation content, and an emotion tone of the user, but is not limited thereto. The user is tagged with multiple features and the conversation content is associated with the user, so that the multi-user conversation in the scenario may be simulated and restored.

In terms of technical implementation, in a GMM-UBM system framework, UBM fits a large number of speaker feature distributions, and data of a target user is scattered near some Gaussian distributions of UBM. An adaptive process is to shift each Gaussian distribution of UBM to the target user data. A process of adapting a GMM model of the target user may be divided into two steps:

First, training data of the target speaker may be used to calculate a new parameter (a Gaussian weight, a mean and a variance, etc.) of the UBM model;

Then, the new parameter obtained may be merged with an original parameter of the UBM model to obtain a model of the target speaker.

A specific calculation method is as follows:

Given the GMM model and a training vector set of the target speaker X=(X1, X2, . . . , XT), the new parameter may be calculated.

A similarity between Xi and the i-th Gaussian distribution in UBM may be calculated:

$$Pr(i|x_t) = \frac{w_i p_i(x_t)}{\sum_{j=1}^{M} w_j p_j(x_t)} \quad \text{equation (1)}$$

Then, $Pr(i|x_t)$ and $x_t$ may be used to calculate the statistics of the weight, the mean and the variance:

$$n_i = \sum_{t=1}^{T} Pr(i|x_t) \quad \text{equation (2)}$$

$$E_i(x) = \frac{1}{n} \sum_{t=1}^{T} Pr(i|x_t) x_t \quad \text{equation (3)}$$

$$E_i(x^2) = \frac{1}{n_i} \sum_{t=1}^{T} Pr(i|x_t) x_t^2 \quad \text{equation (4)}$$

The new parameter obtained at the first step may be merged with the original parameter of the UBM to obtain the model of the target speaker:

$$\overline{w_i} = \left[\frac{\alpha_i^w n_i}{T} + (1-\alpha_i^w) w_i\right] \gamma \quad \text{equation (5)}$$

$$\overline{\mu_i} = \alpha_i^m E_i(x) + (1-\alpha_i^m)\mu_i \quad \text{equation (6)}$$

$$\overline{\sigma_i}^2 = \alpha_i^v E_i(x^2) + (1-\alpha_i^v)(\sigma_i^2 + \mu_i^2) - \overline{\mu_i}^2 \quad \text{equation (7)}$$

In this case, an adaptive parameter $\{\alpha_i^w, \alpha_i^m, \alpha_i^v\}$ is used to adjust the influence of the new parameter and the UBM parameter on the final model. A normalization factor (may be understood as a weight of a weighted value) y may ensure that a weight of each mixing degree meets:

$$\sum_{i=1}^{M} \overline{w_i} = 1 \quad \text{equation (8)}$$

Figure 11:
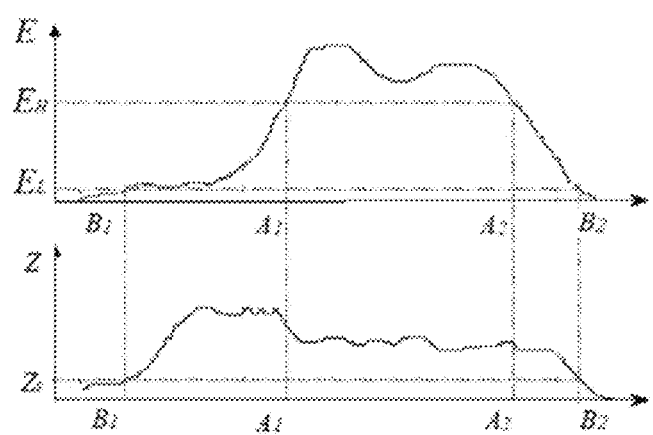
FIG. 11 is a schematic diagram of a voice activity analysis in Voice Activity Detection (VAD) according to an embodiment.

FIG. 11 is a schematic diagram of a voice activity analysis in Voice Activity Detection (VAD) according to an embodiment.

In an embodiment, the VAD may be used to determine the conversation pause time and the conversation exchange frequency in each conversation scenario. The VAD may use short-term energy and a short-term zero-crossing rate of a voice signal. The voice signal may be frame-processed or window-processed. The energy and the zero-crossing rate of the signal of each frame may be calculated. The short-term energy is the sum of the energy of the signal of each frame, a definition of the short-term energy $E_n$ of a signal x(n) is shown as follows:

$$E_n = \sum_{m=-\infty}^{\infty} [x(m) w(n-m)]^2 \quad \text{equation (9)}$$

In this case, w(n) is a window function. The short-term zero-crossing rate refers to the number of times that the signal of each frame passes through zero and may reflect a frequency characteristic of the signal. In order to reduce the interference of low-frequency noise, a threshold T is configured, so that the zero-crossing rate crosses a positive and negative threshold. A calculation equation of the zero-crossing rate may be represented as follows:

$$Z_n = \frac{1}{2} \sum_{m=-\infty}^{\infty} |\text{sgn}[x(m)-T] - \text{sgn}[x(m-1)-T]| + |\text{sgn}[x(m)+T] - \text{sgn}[x(m-1)+T]| \times w(n-m) \quad \text{equation (10)}$$

In this case, sgn is a symbol function.

A voice of a person includes a voiceless voice and a voiced voice. A zero-crossing rate of the voiceless voice is greater than that of silence, thus the voiced voice may be distinguished firstly using the short-term energy, and then the voiceless voice may be extracted using the zero-crossing rate. As such, a voice segment and a non-voice segment may be distinguished, so as to obtain the pause time and the exchange frequency. The specific steps and methods are shown in FIG. 11. An algorithm may include: A high threshold EH and low threshold EL) may be set for the short-term energy, a threshold (ZS) may be set for short-term zero-crossing rate; and By using higher threshold EH, to obtain voiced sound, that is, an interval between A1-A2 in the drawing. Then, since both ends of the voice are voiceless parts and are also parts of the voice, the voiceless part has lower energy but a higher zero-crossing rate. A voiced voice segment may be sought toward the two ends to obtain the voiceless part. A part with short-term energy greater than EL and a short-term zero-crossing rate greater than ZS is considered to be the voiceless part of the voice. Consequently, a part of B1-B2 as illustrated in FIG. 11 may be obtained as the voice signal.

In an embodiment, an emotion component in human language, such as tone and loudness may be extracted and used to identify an emotion state of a speaker. A support vector machine (SVM) may be used to classify these features into various emotion states, such as anger, sadness, fear, happiness, and neutrality.

First, chi-square statistic (CHI) technology is used to establish an emotion feature word vector of a classification model, an equation is as follows:

$$x^2(w, s) = \frac{N[p(s, w)p(\bar{s}, \bar{w}) - p(s, w)p(s, \bar{w})]^2}{f(s, w)} \quad \text{equation (11)}$$

$$f(s, w) = [p(s, w) + p(s, \bar{w})][p(s, w) + p(\bar{s}, w)] \times [p(\bar{s}, w) + p(\bar{s}, \bar{w})][p(s, \bar{w}) + p(\bar{s}, \bar{w})]$$

In this case, $x^2(w, s)$ indicates the chi-square statistic of the word w in the emotion category s; N indicates the size of an emotion training data set; p(s, w) indicates the size of a document including the word w in the emotion category s; p($\bar{s}$, w) indicates the size of a document including the word w in another emotion category excluding the emotion category s; p(s, $\bar{w}$) indicates the size of a document that does not include the word w in the emotion category s, p($\bar{s}$, $\bar{w}$) indicates the size of a document that does not include the word w and is not included in the emotion category s.

The chi-square statistic of each word in a certain emotion category may be counted using the two equations mentioned above. An emotion feature vector threshold may be configured for each category to make the feature vector more distinguishable. Emotion feature word combinations in the emotion category may be combined as the emotion feature vector selected herein. Then, the machine learning method may be used to classify the emotion feature vector to obtain user emotions.

According to an embodiment, the pause time of the voice interaction between users and the change in the exchange frequency between users may be used as a determination parameter of timing of intervention in the conversation. At the same time, emotion parameter and program preset rules may be used to adjust timing of intervention in real time. Accordingly, timing suitable for actively intervening in the conversation in each conversation scenario may be determined.

Figure 12:
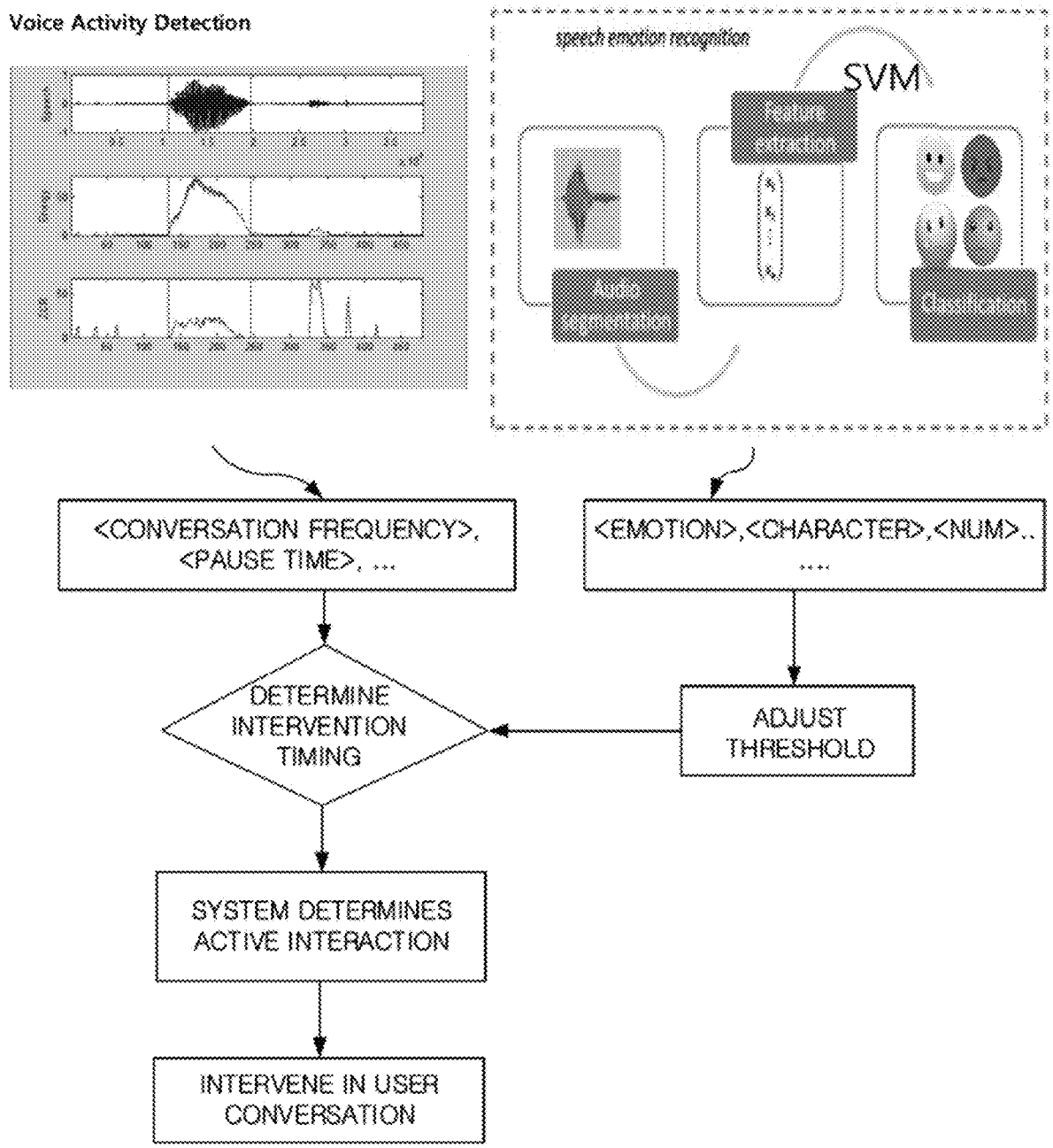
FIG. 12 is a schematic diagram of a determining logic for timing of intervention in a conversation according to an embodiment.

FIG. 12 is a schematic diagram of a determining logic for timing of intervention in a conversation according to an embodiment.

In an embodiment, the voice interaction apparatus may monitor the conversation pause time and a change in conversation exchange frequency in a multi-user conversation, compare the monitored conversation pause time and conversation exchange frequency of the conversation with a preset conversation pause time threshold and conversation exchange frequency threshold. The pause time threshold and the exchange frequency threshold may be configured as an average value of the pause time and an average value of the exchange frequency of user conversation, but are not limited thereto. If a result represented by conversation parameter indicates that there is a break in the conversation between users in this scenario, it may be determined that the corresponding demand feedback content should be actively fed back to the user at this time.

Table 4 is a first exemplary schematic table of an adjustment rule for timing determination threshold.

exchange frequency threshold may be increased and the conversation pause time threshold may be decreased. When the user emotion parameter indicates that the user is scared, the conversation exchange frequency threshold may be increased and the conversation pause time threshold may be decreased. When the user emotion parameter indicates that the user is sad, the conversation exchange frequency threshold may be decreased and the conversation pause time threshold may be increased. When the user character parameter indicates that the user is talkative (i.e., talks a lot), the conversation exchange frequency threshold may be increased and the conversation pause time threshold may be decreased. When the user character parameter indicates that the user is not talkative (i.e., uncommunicative), the conversation exchange frequency threshold may be decreased and the conversation pause time threshold may be increased. When the user character parameter indicates that the user speaks fast, the conversation exchange frequency threshold may be increased and the conversation pause time threshold may be decreased. When the user character parameter indicates that the user speaks slowly, the conversation exchange frequency threshold may be decreased and the conversation pause time threshold may be increased.

Table 4 describes an example of adjusting the conversation pause time threshold and the conversation exchange

TABLE 4

| # of users | Frequency threshold | Pause time threshold | User character | Frequency threshold | Pause time threshold | User Emotion | Frequency threshold | Pause time threshold |
|---|---|---|---|---|---|---|---|---|
| 2 | baseline 5 times/min | baseline 0.3 min | Speaks fast | Increase | Decrease | happy | Increase | Decrease |
| 3 | Increase | Decrease | Speaks slowly | Decrease | Increase | angry | Increase | Decrease |
| . . . | Increase | Decrease | Talkative | Increase | Decrease | scared | Increase | Decrease |
| N | Decrease | Decrease | Not talkative | Decrease | Increase | sad | Decrease | Increase |

In Table 4, for example, a default conversation frequency threshold is a basic value (5 times/minute), and a default pause time threshold is a basic value of 0.3 minutes. At this time, the corresponding number of users is 2. Here, the default number of users may be 2.

In an embodiment, as the number of users in the conversation (the number of users involved in the conversation) increases, the conversation exchange frequency threshold may be increased and the conversation pause time threshold may be decreased.

In an embodiment, the conversation exchange frequency threshold may be increased and the conversation pause time threshold may decreased as the user emotion parameter indicates that a user is happy. When the user emotion parameter indicates that the user is angry, the conversation frequency threshold based on the number of users, the user character parameter, and the user emotion parameter. Those skilled in the art may realize that this description is only exemplary, and is not used to limit a scope of the embodiments.

In an embodiment, when the number of users in the conversation (the number of users involved in the conversation) is greater than a certain value (for example, when exceeding a predetermined threshold 10), the voice interaction apparatus may not intervene in the conversation. In an embodiment, the voice interaction apparatus may analyze intensity level of emotion of user and may not intervene in the conversation when it is determined that emotion of a user is intense or high. In such case, users may be overwhelmed with their conversation. The voice interaction apparatus may not intervene in the conversation so that the users is more immersed in the conversation. In an embodiment, the above logic processing may be implemented based on adjustment of the pause time threshold and the conversation exchange frequency threshold.

Table 5 is a second exemplary schematic table of an adjustment rule for threshold of timing determination.

TABLE 5

| # of users | Frequency threshold | Pause time threshold | User character | Frequency threshold | Pause time threshold | User emotion | Emotion level | Frequency threshold | Pause time threshold |
|---|---|---|---|---|---|---|---|---|---|
| 2 | baseline 5 times/min | baseline 0.3 min | Speaks fast | Increase | Decrease | Happy | High | X | X |
|  |  |  |  |  |  |  | Normal | Increase | Decrease |
| 3 | Increase | Decrease | Speaks slowly | Decrease | Increase | Angry | High | X | X |
|  |  |  |  |  |  |  | Normal | Increase | Decrease |
| ... | Increase | Decrease | Talkative | Increase | Decrease | Scared | High | X | X |
|  |  |  |  |  |  |  | Normal | Increase | Decrease |
| 10 | X | X | Uncommunicative | Decrease | Increase | Sad | High | X | X |
|  |  |  |  |  |  |  | Normal | Decrease | Increase |

In Table 5, for example, a default conversation frequency threshold is a basic value (5 times/minute), and a default pause time threshold is a basic value of 0.3 minutes. At this time, the corresponding number of users is 2. Here, the default number of users may be 2.

As the number of users increases, the conversation exchange frequency threshold may be increased and the conversation pause time threshold may be decreased. As the number of users exceeds a preset threshold (such as 10), the conversation pause time threshold may be determined as a value great enough to determine that intervention timing is not arriving, such as 9999 or ∞. The conversation exchange frequency threshold may be determined as a value small enough to determine that intervention timing is not arriving, such as 0.0001 or 1/∞. In such case, the voice interaction apparatus may monitor the conversation of the users without actively intervening in the conversation. In an embodiment, the voice interaction apparatus may monitor the conversation of the users and detect that the number of the users falls below the preset threshold. In such case, the voice interaction apparatus may adjust the conversation pause time threshold or the conversation exchange frequency threshold to an appropriate value to determine intervention timing.

In table 5, 'X' indicates a value sufficient to determine that intervention timing is not arriving. As explained above, 'X' may be 9999 or ∞, 0.0001 or 1/∞ according to characteristic of a threshold.

In an embodiment, a level of the user emotion parameter may be further divided into high (intense) and normal. When the number of users is less than the preset threshold of the number of people, and the level of the user emotion parameter is high, the conversation pause time threshold may be configured as a value sufficient to determine that the intervention timing does not arrive (a very large value, such as 9999 or ∞ etc.), or the conversation exchange frequency threshold may be configured as a value that is sufficient to determine that the intervention timing does not arrive (a very small value, such as 0.0001 or 1/∞).

In an embodiment, when the number of users is less than the preset threshold of the number of people and the level of the user emotion parameter is normal, then the conversation exchange frequency threshold and the conversation pause time threshold may be adjusted based on the number of users, the user character parameter, and the user emotion parameter. Specifically, when the number of users is less than the preset threshold of the number of people, and the user emotion parameter indicates that the user is happy, the conversation exchange frequency threshold may be increased and the conversation pause time threshold may be decreased. When the number of users is less than the preset threshold of the number of people and the user emotion parameter indicates that the user is angry, the conversation exchange frequency threshold may be increased and the conversation pause time threshold may be decreased. When the number of users is less than the preset threshold of the number of people and the user emotion parameter indicates that the user is scared, the conversation exchange frequency threshold may be increased and the conversation pause time threshold may be decreased. When the number of users is less than the preset threshold of the number of people and the user emotion parameter indicates that the user is sad, the conversation exchange frequency threshold may be decreased and the conversation pause time threshold may be increased. When the number of users is less than the preset threshold of the number of people and the user character parameter indicates that the user is talkative (i.e., talks a lot), the conversation exchange frequency threshold may be increased and the conversation pause time threshold may be decreased. When the number of users is less than the preset threshold of the number of people and the user character parameter indicates that the user is not talkative (i.e., uncommunicative), the conversation exchange frequency threshold may be decreased and the conversation pause time threshold may be increased. When the number of users is less than the preset threshold of the number of people and the user character parameter indicates that the user speaks fast, the conversation exchange frequency threshold may be increased and the conversation pause time threshold be decreased. When the number of users is less than the preset threshold of the number of people and the user character parameter indicates that the user speaks slowly, the conversation exchange frequency threshold may be decreased and the conversation pause time threshold may be increased.

For example, a following adjustment method may be applied to the conversation pause time threshold TimingThreshold.

Number >10 or level of user emotion parameter is intense (high), TimingThreshold=∞;

Number ≤10 and level of user emotion parameter is normal, TimingThreshold=Base+$W_1$*Number+$W_2$*Character+$W_3$*Emotion;

A preset weight for the number of users (Number) may be w1; a preset weight for the user character parameter (character) may be w2; and a preset weight for the user emotion parameter (emotion) may be w3. The user emotion parameter may include two levels such as intense (high) and normal. Base is a conversation pause time threshold before adjustment.

It can be seen that when the number of users is greater than 10 or the level of the user emotion parameter is high, the conversation pause time threshold may be infinite, so that the voice interaction apparatus may not actively intervene in the conversation. When the number of users is less than or equal to 10 and/or the level of the user emotion parameter is normal, weighted values for the number of users, the user emotion parameter and the user character parameter may be calculated based on a weighting algorithm and the sum of the weighted values, and Base may be used as a final conversation pause time threshold. The voice interaction apparatus may select timing to intervene in the conversation.

Table 5 describes an example of adjusting the conversation pause time threshold and the conversation exchange frequency threshold based on the number of users, the user character parameter, and the user emotion parameter. Those skilled in the art may realize that this description is only exemplary, and is not used to limit a scope of the embodiments.

In an embodiment, various methods may be used to train an AI model to learn user characteristics. A feature learning technology may be used to automatically learn a feature from data and find more efficient way to obtain a precise feature so as to make classification more efficient.

Figure 13:
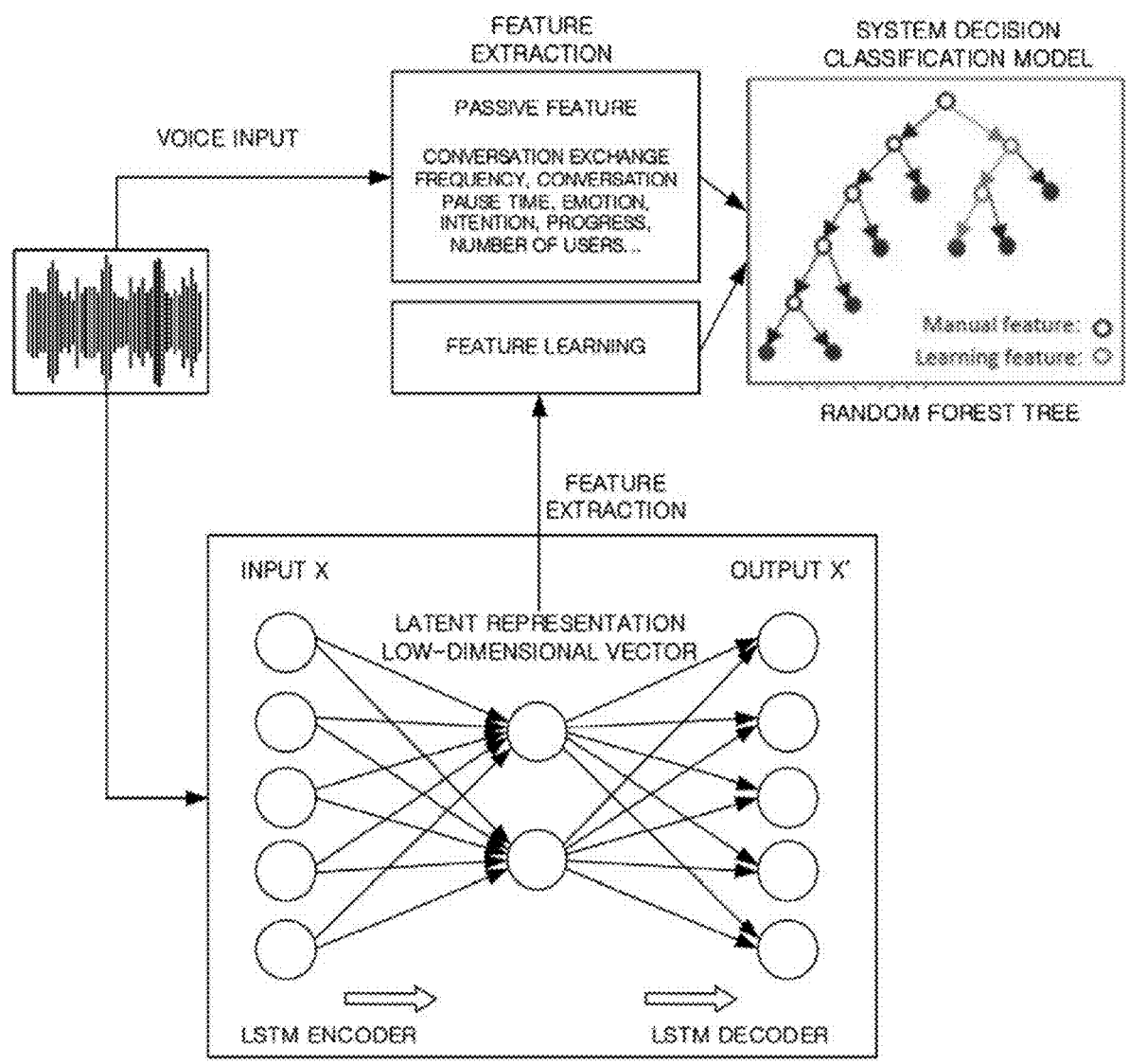
FIG. 13 is a schematic diagram of feature extraction of a Long Short-Term Memory (LSTM) network-Autoencoder according to an embodiment.

FIG. 13 is a schematic diagram of feature extraction of a Long Short-Term Memory (LSTM) network-Autoencoder according to an embodiment. Autoencoder is an unsupervised neural network model that learns a hidden feature which represents input data with a low-dimensional vector. Learned new feature may reconstruct original input data. A middle low-dimensional vector is a learning feature. A feature layer of LSTM includes an LSTM unit, which may store information in a memory over time, and thus may extract a feature including short-term and long-term time-dependent information. For multi-feature multivariate time series data, the LSTM-Autoencoder may be used to perform a decision of active intervention and classification.

In an embodiment, the obtained audio content may be pre-processed to recognize intention of users. The pre-processing may include word segmentation, removal of an unnecessary word which is frequently repeated After pre-processing, intention of a user may be recognized through by using an algorithm for a convolution neural network (CNN) to classify text detected from the conversation, A pre-processed sentence may be passed through an embedding layer to obtain a word vector representation of the sentence, then may be passed to a convolution layer to extract a feature vector of the sentence. Then, the maximum of several one-dimensional vectors obtained after convolution may be determined, and then stitched together as an output value of the layer. Finally, a probability determined for each intention may be output through a fully connected layer. The structure of the entire model is shown in FIG. 14.

Figure 14:
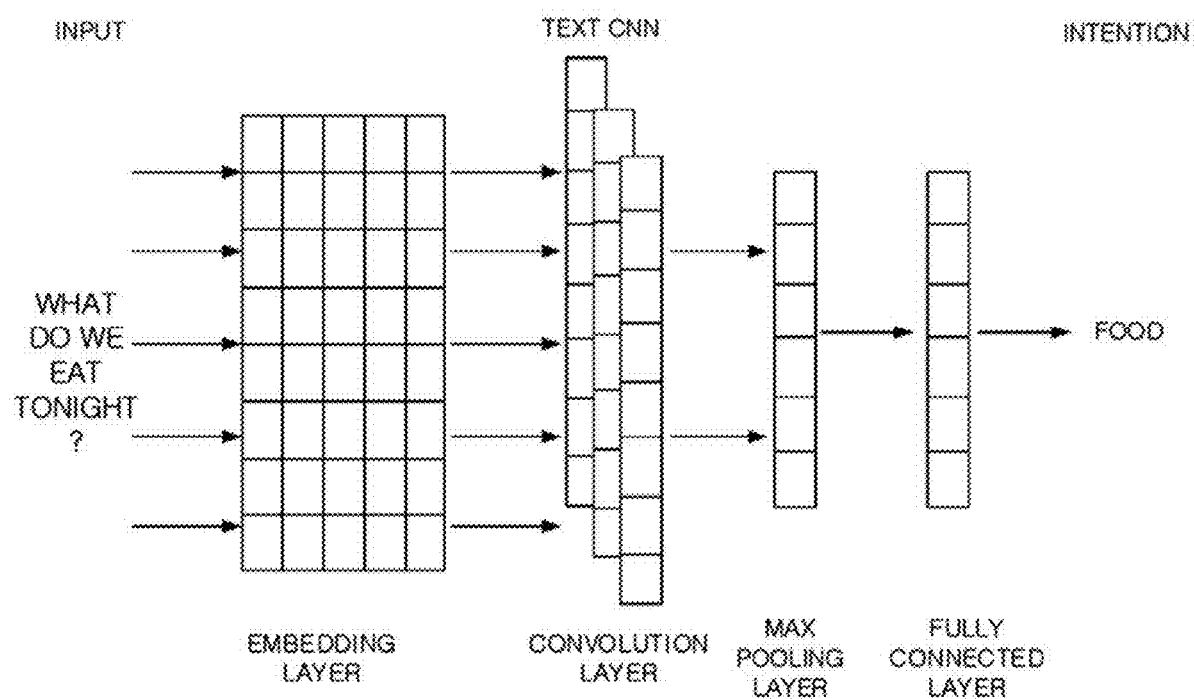
FIG. 14 is a schematic diagram of a Convolutional Neural Networks (CNN) model for intention recognition according to an embodiment.

FIG. 14 is a schematic diagram of a Convolutional Neural Networks (CNN) model for intention recognition according to an embodiment.

After understanding the intention of the user, appropriate feedback content may be selected and returned to the user in a variety of ways, such as voice information, music playback, or picture display. The following are examples of feedback content.

Table 6 is an exemplary table of intention recognition and feedback content.

TABLE 6

| Conversation | Intention | System feedback content |
| --- | --- | --- |
| A: "How is the weather tomorrow?"<br>B: "I don't know." | Weather | Voice prompt: "According to the forecast of the Meteorological Bureau, it rains tomorrow. Please remember bring an umbrella with you when going out." |
| A: "The theme song of "Titanic" is very nice. Can you sing?"<br>B: "It sounds good, but I can't sing" | Music | Music playback: Music playback: the song "My Heart will go on" (A theme song of "Titanic") |
| A: "I'm going to Paris on this holidays."<br>B: "What are good places to visit in Paris?" | Travel | Picture display: Louvre, Eiffel Tower, Notre Dame, etc. |

In an embodiment, the random forest method may be used to determine active intervention timing and active interaction according to features of a pause time, an exchange frequency, emotion, intention etc. of a user in a multi-user chat scenario as obtained above. Random forest may consist of many decision trees. Each decision tree has multiple repeated samplings returned from all sample data as a training set of the model. The classification may be performed according to the features to determine whether to perform the active interaction. As the classification is repeated many times, multiple decision trees may be generated to form the random forest. After obtaining the forest, when a new input is received at the forest, each decision tree in the forest may be used to determine whether to perform the active interaction. Results of the multiple decision trees may be considered by a voting method, and a final decision result may be made by majority rule.

Figure 15:
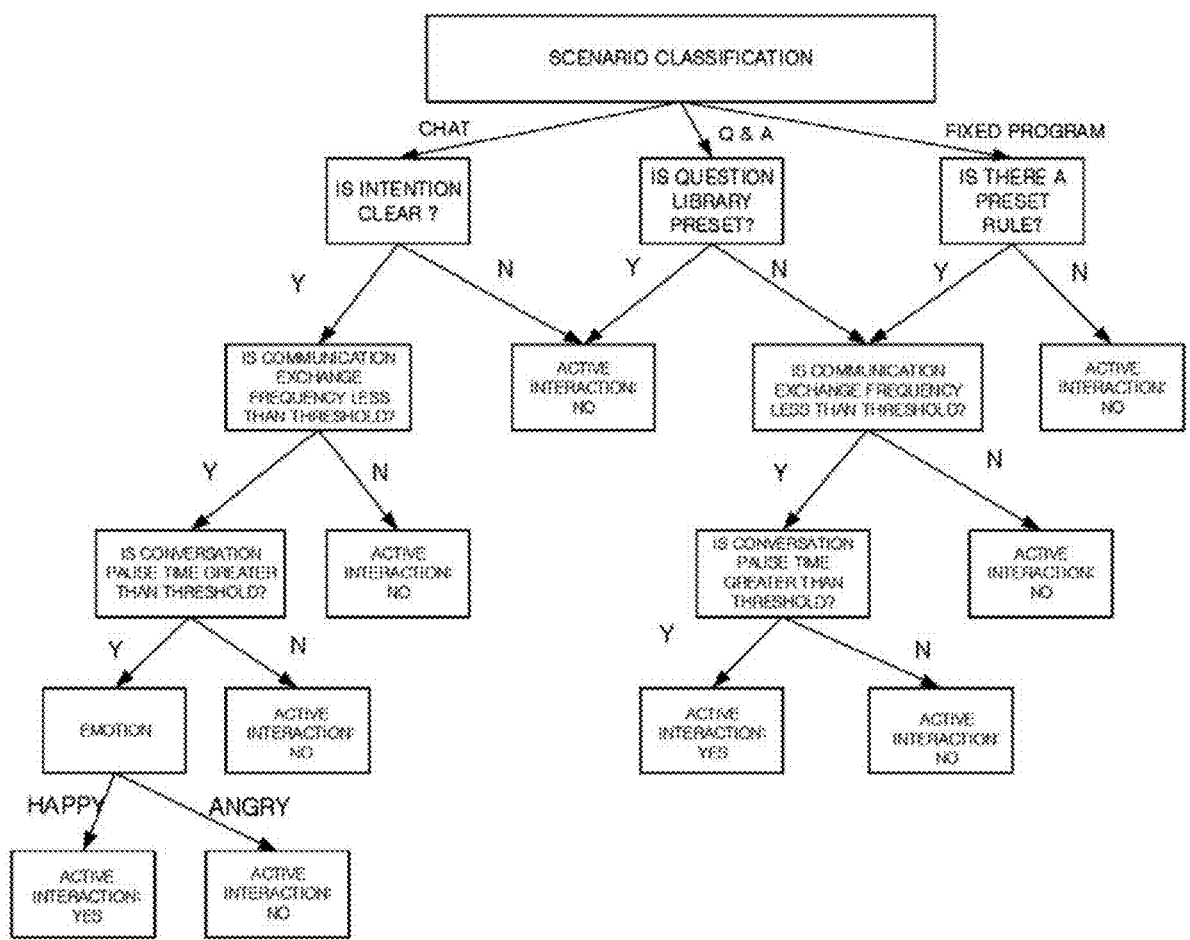
FIG. 15 is a schematic diagram of a decision for whether to perform active interaction according to an embodiment.

FIG. 15 is a schematic diagram of a decision for whether to perform active interaction according to an embodiment. A typical processing logic of whether to perform an active interaction is described in FIG. 15. Those skilled in the art may realize that the processing logic shown in FIG. 15 is only exemplary, and is not used to limit scope of embodiments.

It can be seen that when making a decision for actively intervening in a multi-user conversation, the user conversation scenario may be analyzed, content of the conversation and the user intention may be understood, timing for the active interaction of a smart device in the multi-user conversation scenario may be determined, and appropriate feedback content may be prepared according to a result of the understood intention. When the conditions are met at the same time, the voice interaction apparatus may actively intervene in the multi-user conversation as if the voice interaction apparatus is a participant in the conversation.

The following is a description of a scenario example according to an embodiment.

Figure 16:
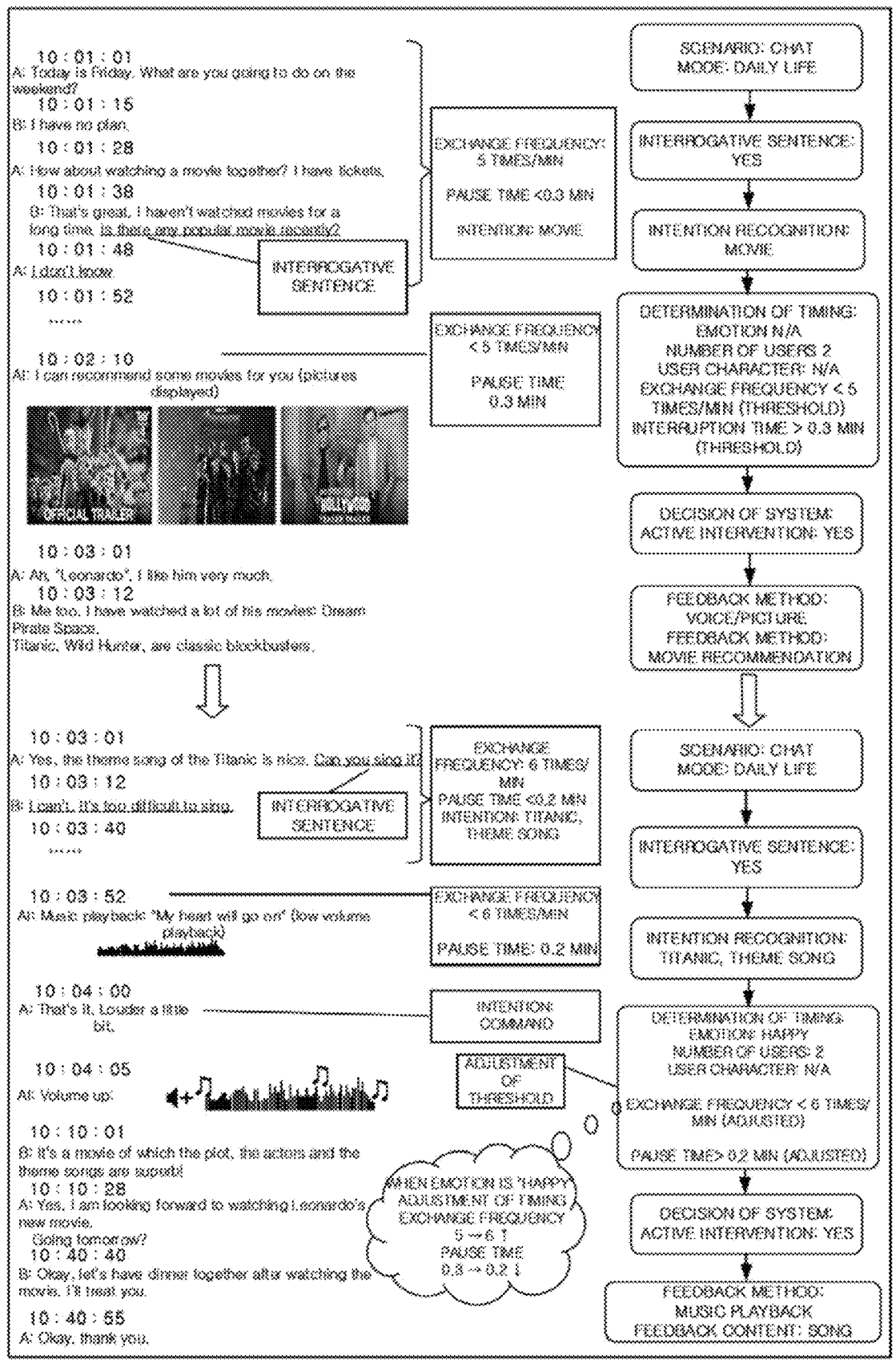
FIG. 16 is a first schematic diagram of an active interaction of a chat type according to an embodiment.

(1) The chat type:
Behavior mode Life Mode
FIG. 16 is a first schematic diagram of an active interaction of a chat type according to an embodiment.

In the conversation scenario of the chat type, a more stable regularity does not exist in the conversation between users for a long period of time. The voice interaction apparatus may detect and recognize the conversation between users in real time, analyze an implicit or explicit intention of the user in the conversation, and detect an appropriate timing to actively intervening in the conversation. After detecting the user's doubt or question and recognizing the user's intention, the voice interaction apparatus may determine an appropriate timing to provide conversation assistance to the user. For example, the threshold of the conversation exchange frequency may be increased and the threshold of the pause time may be decreased according to change of emotion of the user, that is, the timing for actively intervening in the conversation may be adjusted. Accordingly, time wasted by the voice interaction apparatus may be reduced and excessive disturbance to the user may be avoided. This mode may be used as a life assistant.

Behavior mode Life Mode (about the adjustment of the timing determination threshold)

Figure 17:
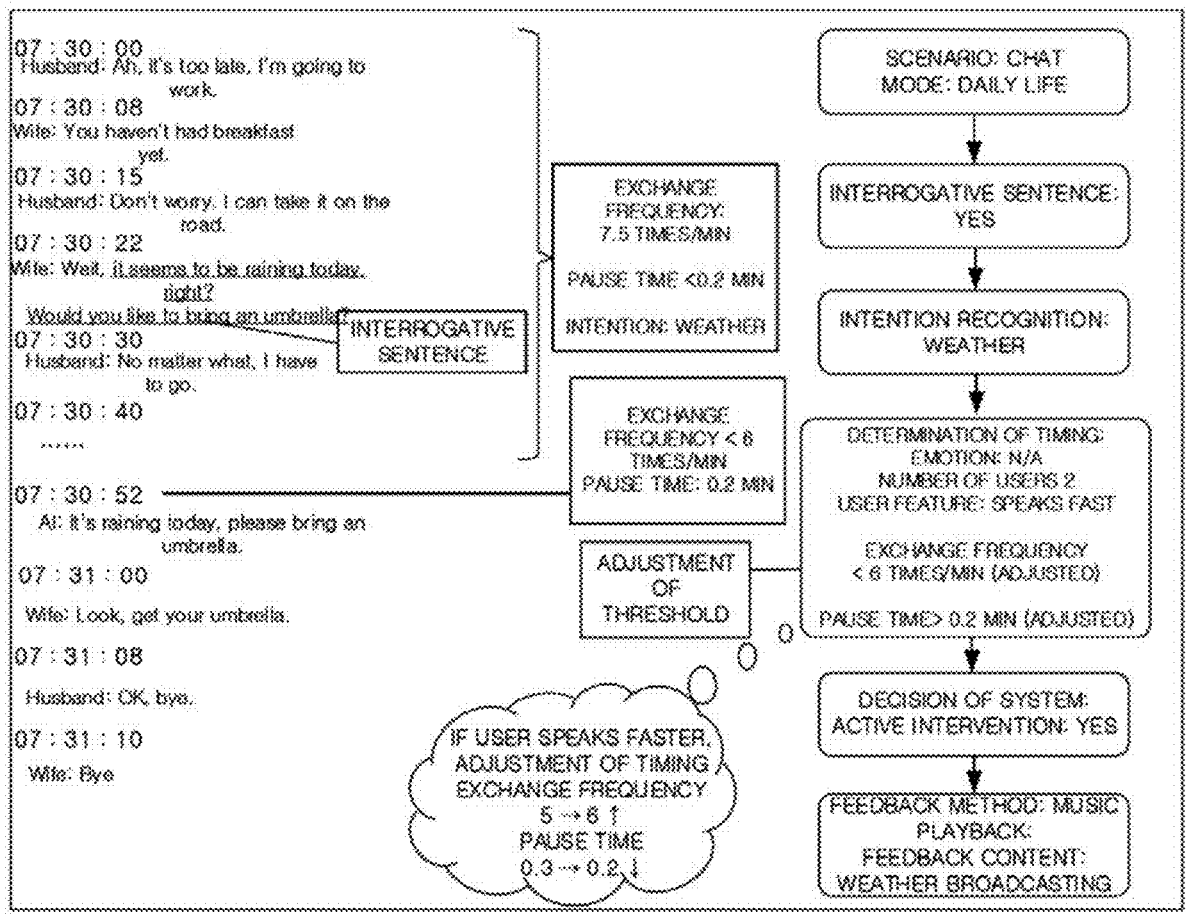
FIG. 17 is a second schematic diagram of an active interaction of a chat type according to an embodiment.

FIG. 17 is a second schematic diagram of an active interaction of a chat type according to an embodiment.

It can be seen that when a user is emotionally nervous and speaks fast, the conversation pause time threshold is decreased and the conversation exchange frequency threshold is increased, so that intervention of the voice interaction apparatus may become more frequent.

Figure 18:
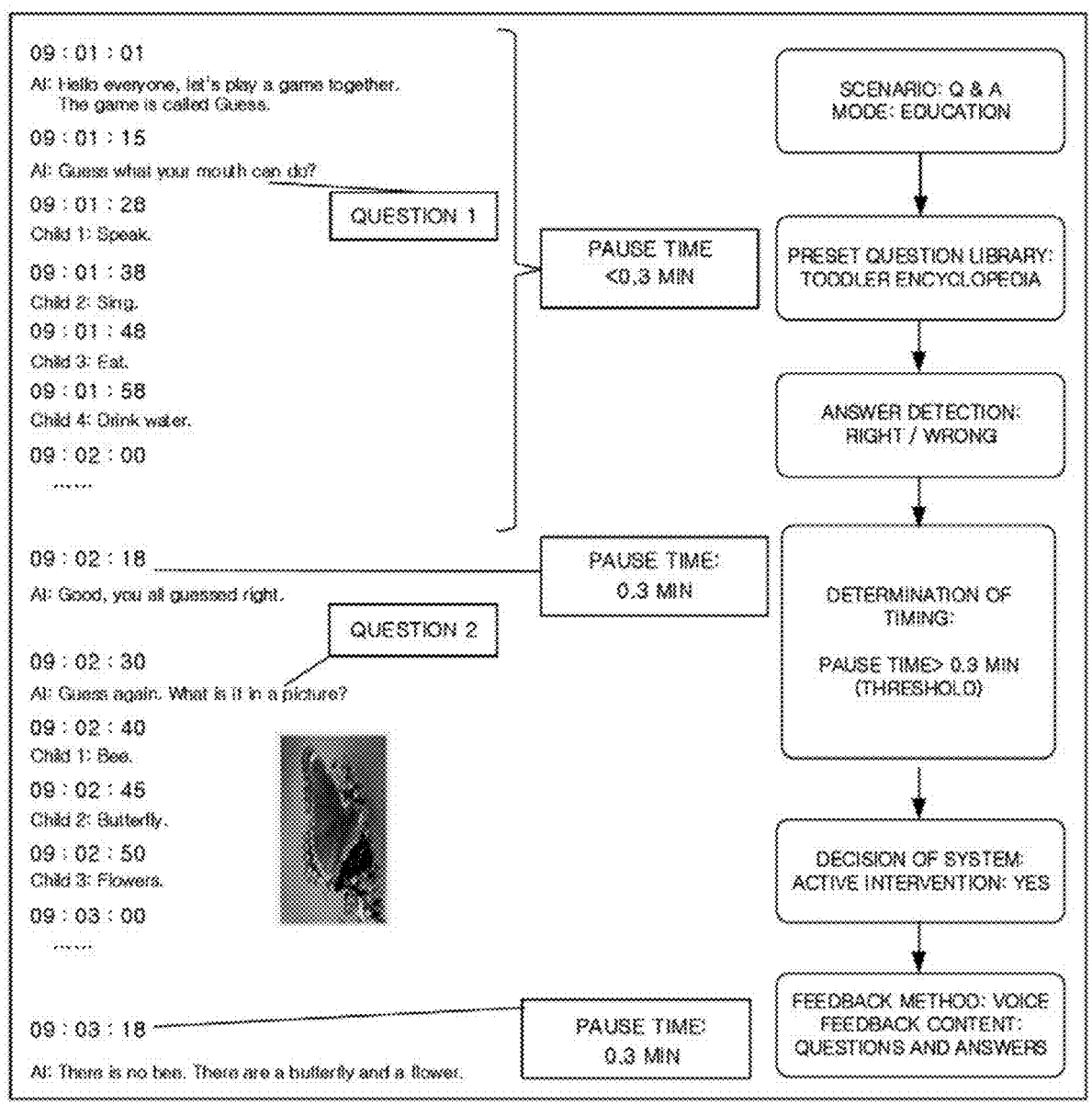
FIG. 18 is a schematic diagram of an active interaction of the Q&A discussion type according to an embodiment.

(2) The Q&A Discussion Type:

A conversation scenario of the Q & A discussion type has certain conversation logic. The system may ask a question to users based on a preset question library, determine intervention timing based on a conversation pause time and conversation exchange frequency for smooth progress of the Q & A discussion type conversation Behavior mode Education Mode-Kindergarten FIG. 18 is a schematic diagram of an active interaction of the Q&A discussion type according to an embodiment.

In the education mode, the voice interaction apparatus may ask questions to children according to a preset question library and detect their answers to draw their attention and promote their participation in the conversation.

(3) The Fixed Conversation Program Type

In a scenario of the fixed conversation program type, the overall conversation strictly follows a certain rule. The conversation program is progressed according to a certain rule, and may be referred to as a fixed conversation program. Rules of the conversation program may be changed, but the conversation program ruled by a rule before change may still be referred to as the fixed conversation program. The rule may include order of speech, total time of speech, response time (from when a previous user ends his or her speech to when a next user starts his or her speech), speech content, etc., but is not limited thereto. The voice interaction apparatus may determine whether a conversation program (such as Mafia Game of FIG. 19) is progressed according to such rules. In an embodiment, the voice interaction apparatus may intervene in the conversation program to encourage or push a user to give speech so that the conversation program is smoothly progressed according to a predetermined rule.

In an embodiment, the voice interaction apparatus may determine whether a user participating in the conversation program has ended his or her speech. For example, the voice interaction apparatus may determine whether all users participating in the conversation program have ended their speech. For example, when a conversation program in which 5 users participate is being progressed by the voice interaction apparatus, the voice interaction apparatus may determine whether all 5 users have ended their speech to output speech request feedback to a user who has not given speech yet.

In an embodiment, whether speech of a user is ended in a fixed conversation program type scenario may be determined. For example, when a conversation program in which 5 users participate and take turn to give speech according to a certain order is being progressed by the voice interaction apparatus, the voice interaction apparatus may determine whether a user of a certain order has given speech, and then output speech request feedback to a next user.

The voice interaction apparatus may determine whether the current intervention timing is appropriate for the preset program based on pause time, and return preset content information to users at appropriate timing.

Behavior mode: Game mode-Game (the voice interaction apparatus operating as a master controller, for example, as God which is aware of a role and action of users in a game played by 5 users)

Figure 19:
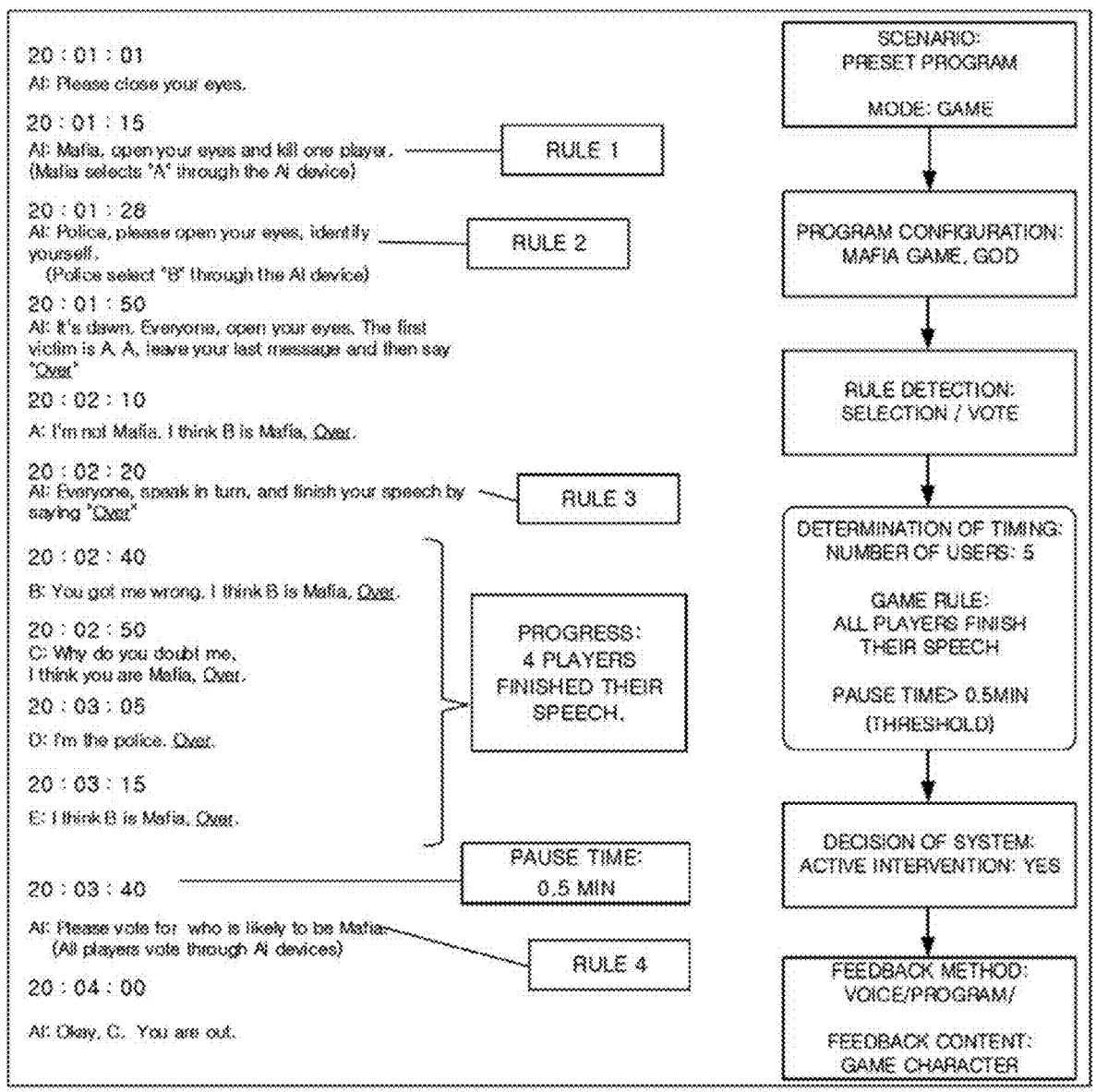
FIG. 19 is a schematic diagram of an active interaction of the fixed conversation program type according to an embodiment.

FIG. 19 is a schematic diagram of an active interaction of the fixed conversation program type according to an embodiment.

In the above game mode, the voice interaction apparatus, as the master controller, may control processes of the conversation program (that is, the game program process) according to a rule of the game, progress the program by speaking according to a preset rule and collecting votes from users in order to provide users with a better gaming experience.

It can be seen that conventional passive voice interaction may be transformed into active voice interaction, which is closer to a natural interaction, where the voice interaction apparatus participates in the conversation between users at appropriate timing according to an embodiment. A feature of the multi-user conversation is analyzed through scenario classification, and a specific condition for the active intervention timing is defined based on the classification, so as to determine appropriate active interaction timing. Finally, at this timing, appropriate feedback content may be provided according to the user intention recognized in the multi-user conversation scenario to improve use experience of an intelligent voice interaction system. In addition, the feedback content may be provided to all or some intelligent voice devices that users have or one intelligent voice device, which may bring more values in the field of artificial intelligence's voice interaction. Preferably, the voice interaction apparatus may be implemented based on the Session-Oriented framework according to the embodiment.

Figure 20:
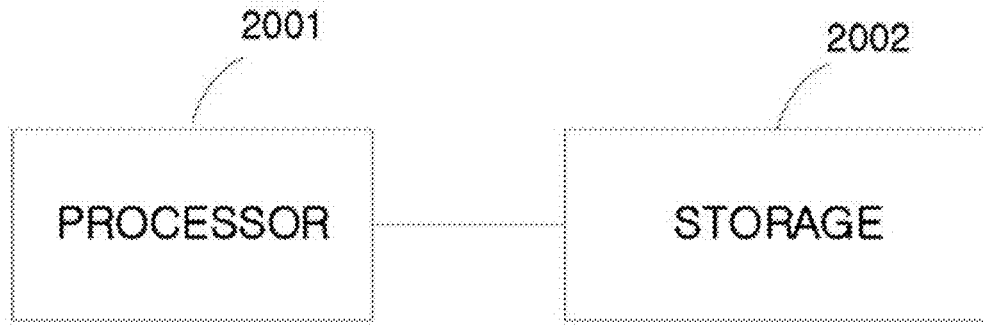
FIG. 20 is a structural diagram of a voice interaction apparatus configured with a storage-processor architecture according to an embodiment.

FIG. 20 is a structural diagram of a voice interaction apparatus configured with a storage-processor architecture according to an embodiment.

As shown in the FIG. 20, the voice interaction apparatus may include a processor 2001 and a storage 2002. The storage 2002 stores an application program that may be executed by the processor 2001, so that the processor 2001 performs the voice interaction method described above.

In this case, the storage 2002 may be specifically implemented as various storage media such as an electrically erasable and programmable read-only memory (EEPROM), a Flash memory, a programmable program read-only memory (PROM), etc. The processor 2001 may be implemented to include one or more central processing units or one or more field programmable gate arrays, where the field programmable gate array integrates one or more central processing unit cores. Specifically, the central processing unit or the central processing unit core may be implemented as a CPU or an MCU.

Figure 21:
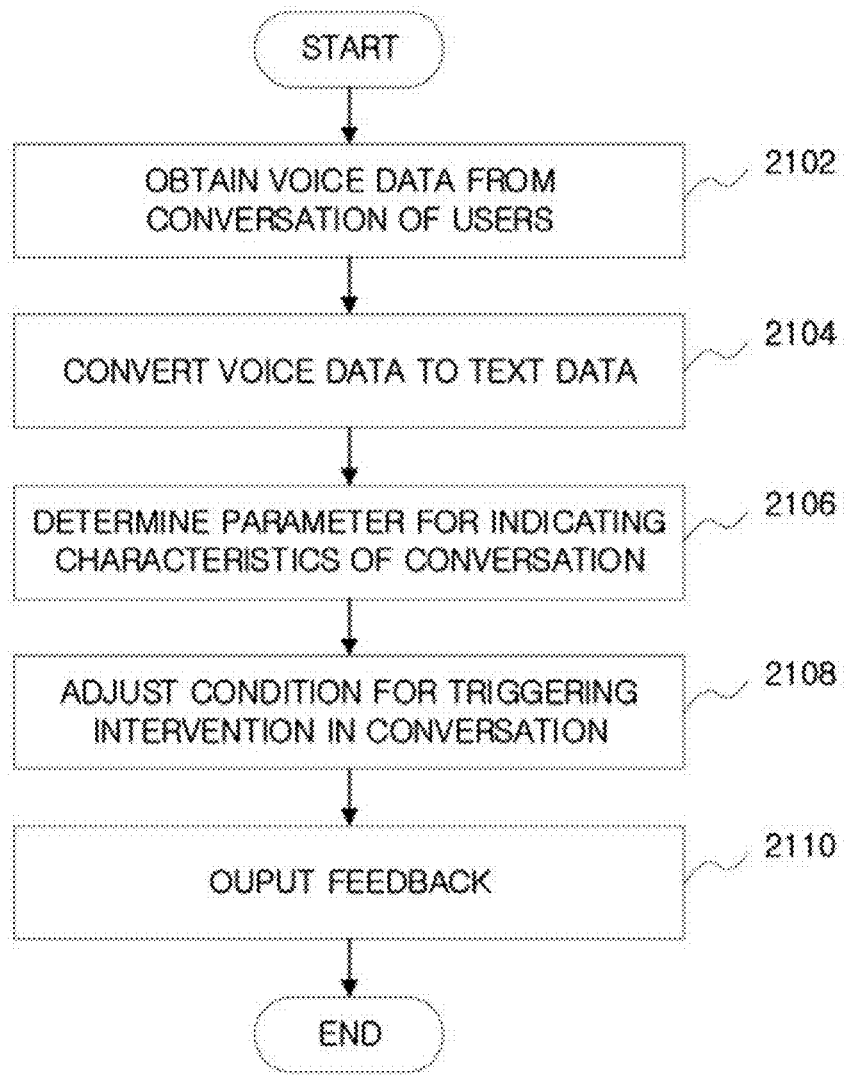
FIG. 21 illustrates a flowchart of a method according to an embodiment.

FIG. 21 illustrates a flowchart of a method according to an embodiment.

In operation 2102, voice data may be obtained from a conversation of users. According to an embodiment, the voice interaction apparatus may monitor the conversation of the users to obtain voice data without receiving a wake-up word. Accordingly, the voice interaction apparatus may actively intervene in the conversation of the users.

In operation 2104, the obtained voice data may be converted to text data. Conversion of voice data to text data and recognition of intention of the users are described as above by referring to FIGS. 3, 4, and 5, thus redundant explanation is omitted.

In operation 2106, a parameter for indicating characteristics of the conversation may be determined. In an embodiment, the parameter may be determined based on the obtained voice data. In an embodiment, the parameter may be determined based on the text data converted from the voice data. In an embodiment, the parameter may be determined based on the obtained voice data and the text data converted from the voice data.

In an embodiment, the parameter may include a conversation scenario parameter indicating a scenario of the conversation. The conversation scenario parameter may indicate that the conversation is a chat-type, a Q&A type, a fixed conversation program, etc., but is not limited thereto. The conversation scenario parameter is described as above by referring to FIG. 6, thus redundant explanation is omitted.

In operation 2108, a condition for triggering intervention in the conversation may be adjusted. The condition for triggering intervention in the conversation may be adjusted from a predetermined value. In an embodiment, the condition may be determined or adjusted based on the parameter determined in operation 2106.

In an embodiment, the condition may be different according to the conversation scenario parameter. For example, a condition for a chat scenario may be more eased than conditions for other scenario. The condition may be related to a threshold, and a size of the threshold may be different according to the parameter. For example, the condition may be related to a conversation pause time threshold and a conversation exchange frequency threshold. In an embodiment, the condition may be adjusted during the conversation according to the conversation scenario parameter. For example, the conversation pause time threshold and the conversation exchange frequency threshold may be inversely adjusted.

In operation 2110, feedback may be output. In an embodiment, the feedback may be output when the condition adjusted in operation 2108 is satisfied. For example, the feedback may be output when a conversation pause time during the conversation exceeds the conversation pause time threshold or when a conversation exchange frequency during the conversation falls below the conversation exchange frequency threshold. The feedback may correspond to the intention of a user detected during the conversation. Analysis of intention of the user is described as above by referring to FIGS. 13 and 14, thus redundant explanation is omitted.

In an embodiment, the parameter may include a number-of-users parameter indicating the number of users participating in the conversation. The number-of-users parameter is described as above by referring to FIG. 7, thus redundant explanation is omitted. The condition may be adjusted in operation 2108 according to the number-of-users parameter. For example, as the number-of-users parameter increases, that is, as more users participates in the conversation, the conversation pause time threshold may be decreased, and the conversation exchange frequency threshold may be increased.

In an embodiment, the parameter may include a user characteristic parameter indicating characteristics of a user. The user character parameter is described as above by referring to FIG. 8, thus redundant explanation is omitted. The condition may be adjusted in operation 2108 according to user character parameter. The user character parameter may be determined based on speech tempo of a user. The user character parameter may be determined based on an amount of speech of a user within a unit time. Accordingly, as the speech tempo of the user or the amount of speech of the user within the unit time is increased, the conversation pause time threshold may be decreased and the conversation exchange frequency threshold may be increased.

In an embodiment, the parameter may include a user emotion parameter indicating an emotion state of a user participating in the conversation, and the condition may be adjusted in operation 2108 according to the user emotion parameter. For example, as the user emotion parameter increases, that is, as emotion of a user is intensified during the conversation, the conversation pause time threshold may be decreased, and the conversation exchange frequency threshold may be increased. Adjustment of the condition is described as above with various examples by referring to FIGS. 12, 15, 16, 17, 18, 19, and 20, thus redundant explanation is omitted.

In an embodiment, intervention of the voice interaction apparatus may be delayed by adjusting the condition based on the parameter. For example, the condition may be adjusted so that the voice interaction apparatus does not intervene in the conversation of the users. For example, the conversation pause time threshold may be set as a relatively very large value (as compared to 0.5 min) and the conversation exchange frequency threshold may be set as a relatively very small value (as compared to 5 times/min). Adjusting the condition to keep the voice interaction apparatus out of the conversation is described as above by referring to Table 5, thus redundant explanation is omitted.

In an embodiment, a weighted value may be calculated for each parameter to adjust the condition. The weighted value of the parameter is described as above by referring to FIGS. 9 and 10, thus redundant explanation is omitted.

It should be noted that not all steps (or operations) and modules (or units) in the above flowcharts and structure diagrams are necessary, and some steps (or operations) or modules (or units) may be ignored according to various practical applications. The execution order of each step is not fixed and may be adjusted as needed. The division or subdivision of each module is to describe their function efficiently and concisely. In various practical applications, a module may be divided into multiple modules or subdivided into multiple sub-modules, and functions of multiple modules or sub-modules may also be implemented by the same module. These modules may be located on the same device, or in different devices.

A hardware modules in embodiments may be implemented mechanically or electronically. For example, the hardware module may include a specially-designed permanent circuit or logic component (such as a dedicated processor, e.g., an FPGA or ASIC) to perform a specific operation. The hardware module may also include a programmable logic component or circuit temporarily configured by software (for example, including a general-purpose processor or another programmable processor) for performing a specific operation. The specific implementation of the mechanical module by the mechanical means, or by the dedicated permanent circuit, or by the temporarily-configured circuit (such as configured by software), may be determined according to cost and time considerations.

According to an aspect of the present disclosure, a machine-readable storage medium storing instructions for causing a machine to carry out the voice interaction methods may be provided. Specifically, a system or apparatus provided with a storage medium may be provided, on which a software program code that implements the functions of any one of the above embodiments is stored, and the computer (or CPU or MPU) of the system or apparatus may read out and execute the program code stored in the storage medium. In addition, some or all of the actual operations may also be performed by an operating system or the like operating on a computer through instructions based on the program code. It is also possible to write the program code read from the storage medium into a storage provided in an expansion board inserted into the computer or into a storage provided in an expansion unit connected to the computer. Subsequently, the CPU installed on the expansion board or the expansion unit performs part and all of the actual operations on the basis of the instructions of the program code, thereby realizing the functions of any one of the above embodiments.

Embodiments of the storage medium for providing the program code include a floppy disk, a hard disk, a magneto-optical disk, an optical disk (such as a CD-ROM, CD-R, CD-RW, DVD-ROM, DVD-RAM, DVD-RW, DVD+RW), Magnetic tape, a non-volatile storage card and ROM. Alternatively, the program code may be downloaded by a communication network from a server computer or a cloud.

As used herein, "schematic" means "serving as an example, instance, or illustration." Any illustration or implementation described herein as "schematic" should not be interpreted as a more preferred or more advantageous technical solution. In order to make the drawings concise, the figures only schematically show the relevant parts, and do not represent an actual structure as a product. In addition, in order to make the drawings simple and easy to understand, only one of components having the same structure or function is schematically illustrated or represented in some drawings. Herein, "one" does not mean that the number of relevant parts is limited to "only this one", and "one" does not exclude a situation that the number of relevant parts is "more than one". Herein, "up", "down", "front", "back", "left", "right", "inside", "outside", etc. are only used to indicate a relative positional relationship between related parts, and do not limit absolute positions of these related parts.

The above descriptions are preferred embodiments, and are not intended to limit scope of embodiments. Any modification, equivalent replacement, and improvement made within the spirit and principle shall be included in the disclosure.

Functions related to AI may be operated by a processor and a memory. The processor may consist of one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

The methods may be performed by hardware, software, or a combination of hardware and software according to an embodiment. When an embodiment is embodied by using software, one or more programs (software, software module) may be used. A program may be included in a computer-readable recording medium, but is not limited thereto. A program may be included in a computer program product. The computer-readable recording medium storing a program may be included in the computer program product. A program may be configured to be executable by one or more processors in the electronic device. The one or more processor may include instructions which, when executed by one or more processors in the electronic device, cause the electronic device to perform the methods according to an embodiment.

A computer readable recording medium may be volatile, non-volatile, or a combination of volatile and non-volatile, where appropriate. The computer readable recording medium may include a computer storage medium and communication medium. The computer-readable recording media may be any available media that can be accessed by a computer and include both volatile and nonvolatile media and both detachable and non-detachable media. Furthermore, the computer-readable recording media may include computer storage media and communication media. The communication media typically includes computer readable instructions, data structure, program modules, and any type of information transferring media. Embodiments of the disclosure may be implemented through a computer-readable recording medium or a computer program product having recorded thereon computer-executable instructions such as program modules that are executed by a computer. A plurality of computer-readable recording media may be distributed in computer systems which are connected via a network, data stored in the distributed recording media such as instructions and codes may be executed by at least one processor.

Functions of various elements illustrated in drawings may be provided by using not only hardware which is capable of executing related software but also dedicated hardware. When a function is provided by a processor, the function may be provided by a dedicated processor, a single shared processor, or a plurality of individual processors of which a part may be shared. The term "processor" or "controller" should not be interpreted as only referring to hardware executable of software, and may include a digital signal processor hardware, a read-only memory, random access memory, and volatile storing device for storing software.

The operations of all methods described herein can be performed in an appropriate order unless otherwise indicated herein or otherwise clearly contradicted by context. The exemplary embodiments are not limited by an order in which the operations are described herein. The use of any and all examples, or exemplary language (e.g., "such as") provided herein, is intended merely to clearly describe the exemplary embodiments and does not pose a limitation on the exemplary embodiments unless otherwise claimed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a memory storing at least one instruction; and
    at least one processor configured to execute the at least one instruction to:
        obtain voice data from a conversation of at least one user, a condition for triggering intervention in the conversation of the at least one user being preset in the electronic device,
        convert the voice data to text data,
        determine at least one parameter indicating a characteristic of the conversation of the at least one user based on at least one of the voice data or the text data,
        adjust the condition for triggering the intervention in the conversation of the at least one user based on the at least one parameter, and
        output a feedback based on the text data when the adjusted condition is satisfied,
    wherein the condition comprises a first threshold and a second threshold different from the first threshold, and
    wherein the at least one processor is further configured to adjust each of the first threshold and the second threshold based on a change in the at least one parameter.

2. The electronic device of claim 1, wherein the at least one parameter comprises a user character parameter indicating a characteristic of the at least one user participating in the conversation, and
    wherein the at least one processor is further configured to execute the at least one instruction to adjust the condition for triggering the intervention during the conversation based on the user character parameter.

3. The electronic device of claim 2, wherein the at least one processor is further configured to execute the at least one instruction to determine the user character parameter based on speech tempo of the at least one user.

4. The electronic device of claim 2, wherein the at least one processor is further configured to execute the at least one instruction to determine the user character parameter based on an amount of speech of the at least one user within a unit time.

5. The electronic device of claim 2, wherein the condition first threshold is a conversation pause time threshold and the second threshold is a conversation exchange frequency threshold, and
    wherein the at least one processor is further configured to execute the at least one instruction to decrease the conversation pause time threshold and increase the conversation exchange frequency threshold when a speech tempo of the at least one user quickens or an amount of speech of the at least one user increases.

6. The electronic device of claim 1, wherein the first threshold is a conversation pause time threshold and the second threshold is a conversation exchange frequency threshold.

7. The electronic device of claim 6, wherein the at least one processor is further configured to execute the at least one instruction to inversely adjust the conversation pause time threshold and the conversation exchange frequency threshold based on the change in the at least one parameter.

8. The electronic device of claim 6, wherein the at least one processor is further configured to execute the at least one instruction to output the feedback when a conversation pause time during the conversation exceeds the conversation pause time threshold or when a conversation exchange frequency during the conversation of the at least one user falls below the conversation exchange frequency threshold.

9. The electronic device of claim 1, wherein the at least one parameter comprises a conversation scenario parameter indicating a scenario of the conversation of the at least one user, and
    wherein the at least one processor is further configured to execute the at least one instruction to adjust the condition based on the conversation scenario parameter.

10. The electronic device of claim 9, wherein the at least one processor is further configured to execute the at least one instruction to adjust the condition during the conversation of the at least one user based on the conversation scenario parameter.

11. The electronic device of claim 1, wherein the at least one parameter comprises a number-of-users parameter indicating a number of the at least one user, and
    wherein the at least one processor is further configured to execute the at least one instruction to vary the condition based on the number-of-users parameter.

12. The electronic device of claim 11, wherein the first threshold is a conversation pause time threshold and the second threshold is a conversation exchange frequency threshold, and
    wherein the at least one processor is further configured to execute the at least one instruction to decrease the conversation pause time threshold and increase the conversation exchange frequency as the number-of-users parameter increases.

13. The electronic device of claim 1, wherein the at least one parameter comprises a user emotion parameter indicating an emotion state of the at least one user, and
    wherein the at least one processor is further configured to execute the at least one instruction to adjust the condition during the conversation of the at least one user based on the user emotion parameter.

14. The electronic device of claim 13, wherein the first threshold is a conversation pause time threshold and the second threshold is a conversation exchange frequency threshold, and wherein the at least one processor is further configured to execute the at least one instruction to decrease the conversation pause time threshold and increase the conversation exchange frequency as the user emotion parameter increases.

15. The electronic device of claim 1, wherein the at least one processor is further configured to execute the at least one instruction to adjust the condition during the conversation of the at least one user based on the change in the at least one parameter to delay the intervention in the conversation of the at least one user.

16. The electronic device of claim 15, wherein the first threshold is a conversation pause time threshold and the second threshold is a conversation exchange frequency threshold, and
wherein the conversation pause time threshold increases and the conversation exchange frequency threshold decreases to delay the intervention in the conversation of the at least one user.

17. The electronic device of claim 1, wherein the at least one processor is further configured to execute the at least one instruction to calculate a weight value of the at least one parameter, and adjust the condition based on the weight value.

18. A method of an electronic device in which a condition for triggering intervention in a conversation of at least one user is preset, the method comprising:
obtaining voice data from the conversation of the at least one user,
converting the voice data to text data,
determining at least one parameter indicating a characteristic of the conversation of the at least one user based on at least one of the voice data or the text data,
adjusting the condition for triggering the intervention in the conversation of the at least one user based on the at least one parameter, and
outputting a feedback based on the text data when the adjusted condition is satisfied,
wherein the condition comprises a first threshold and a second threshold different from the first threshold, and
wherein the adjusting of the condition comprises adjusting each of the first threshold and the second threshold based on a change in the at least one parameter.

19. A non-transitory computer-readable recording medium having recorded thereon a program executable by a computer for performing the method of claim 18.

20. The method of claim 18, wherein the at least one parameter comprises a user character parameter indicating a characteristic of the at least one user participating in the conversation, and
wherein the adjusting of the condition for triggering the intervention comprises adjusting the condition for triggering the intervention based on the user character parameter.

* * * * *